United States Patent
Yano

(10) Patent No.: US 12,235,139 B2
(45) Date of Patent: Feb. 25, 2025

(54) CABLE SYSTEM

(71) Applicant: NEC Corporation, Tokyo (JP)

(72) Inventor: Yutaka Yano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 275 days.

(21) Appl. No.: 17/771,891

(22) PCT Filed: Oct. 12, 2020

(86) PCT No.: PCT/JP2020/038490
§ 371 (c)(1),
(2) Date: Apr. 26, 2022

(87) PCT Pub. No.: WO2021/090644
PCT Pub. Date: May 14, 2021

(65) Prior Publication Data
US 2022/0397431 A1     Dec. 15, 2022

(30) Foreign Application Priority Data

Nov. 8, 2019   (JP) ................................. 2019-203272

(51) Int. Cl.
*G01D 5/353*   (2006.01)
*G01H 9/00*    (2006.01)

(52) U.S. Cl.
CPC .......... *G01D 5/35358* (2013.01); *G01H 9/004* (2013.01)

(58) Field of Classification Search
USPC ........................................................ 73/655
See application file for complete search history.

(56) References Cited

U.S. PATENT DOCUMENTS

| 4,777,661 A | 10/1988 | Spillman, Jr. |
| 7,595,865 B2 | 9/2009 | Hartog et al. |

(Continued)

FOREIGN PATENT DOCUMENTS

| CA | 2521546 C | * 5/2010 | ............. G01K 11/32 |
| JP | S63-113323 A | 5/1988 | |

(Continued)

OTHER PUBLICATIONS

International Search Report for PCT Application No. PCT/JP2020/038490, mailed on Dec. 1, 2020.

(Continued)

*Primary Examiner* — Clayton E. LaBalle
*Assistant Examiner* — Warren K Fenwick
(74) *Attorney, Agent, or Firm* — Sughrue Mion, PLLC

(57) ABSTRACT

To apply an optical amplification repeater device to optical fiber sensing to lengthen a sensing range, as well as to enable compatibility with an optical communication system a cable system that uses a cable for optical fiber communication and optical fiber sensing of an environment surrounding the cable, wherein: the optical fiber communication is bidirectional communication using optical fiber pairs which are pairs of the optical fiber; in an optical fiber, a first wavelength band and a second wavelength band are different from each other; an optical amplification unit included in the optical amplification repeater device includes a first amplifier and a second amplifier that amplify rays of light in mutually opposing directions; and each of the communication optical signal, the probe light, and the backscattering light is amplified by at least either the first amplifier or the second amplifier.

17 Claims, 15 Drawing Sheets

(56) References Cited

U.S. PATENT DOCUMENTS

| | | | |
|---|---|---|---|
| 10,348,440 B2 * | 7/2019 | Aida | ............... H02J 1/00 |
| 2009/0154870 A1 | 6/2009 | Watanabe et al. | |
| 2010/0091355 A1 | 4/2010 | Ota | |
| 2018/0080812 A1 | 3/2018 | Wu et al. | |
| 2018/0164526 A1 | 6/2018 | Geiger et al. | |

FOREIGN PATENT DOCUMENTS

| | | |
|---|---|---|
| JP | H02-189507 A | 7/1990 |
| JP | H04-5529 A | 1/1992 |
| JP | 2712103 B | 2/1998 |
| JP | 3093510 B | 10/2000 |
| JP | 2006-208279 A | 8/2006 |
| JP | 2007-040738 A | 2/2007 |
| JP | 2010-200361 A | 9/2010 |
| JP | 2014-165858 A | 9/2014 |
| WO | 2008/105202 A1 | 9/2008 |

OTHER PUBLICATIONS

English translation of Written opinion for PCT Application No. PCT/JP2020/038490, mailed on Dec. 1, 2020.
Optical Submarine Cable Writing Committee, "Hikari Kaitei Cable", Parade Inc., ISBN 978-4-434-14494-3, May 2010, pp. 95-101.

* cited by examiner

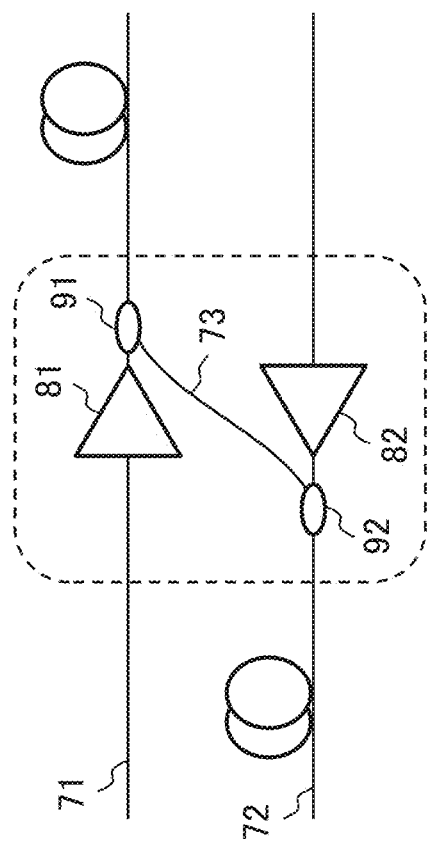
Fig.1A -- RELATED ART --

CABLE SYSTEM

This application is a National Stage Entry of PCT/JP2020/038490 filed on Oct. 12, 2020, which claims priority from Japanese Patent Application 2019-203272 filed on Nov. 8, 2019, the contents of all of which are incorporated herein by reference, in their entirety.

TECHNICAL FIELD

The present invention relates to optical fiber sensing.

BACKGROUND ART

Optical fibers are widely used for communication. For example, submarine optical cable communication systems that connect lands separated by sea are widely laid all over the world today as an implementation means for an international communication network and are used.

In an optical communication system using an optical cable, optical amplification repeater devices are inserted in the optical cable at predetermined intervals in order to compensate for transmission loss in optical fibers. Driving power of the optical amplification repeater devices is supplied from a landing site of the cable through a power supply line in the optical cable.

A device that is widely accepted today as an implementation means for an optical amplifier is an Er-doped fiber amplifier (EDFA). The EDFA functions as a laser amplifier by inputting excitation light to a special optical fiber, which is referred to as an Er-doped fiber. Semiconductor optical amplifiers (SOA) are also used for some limited uses. The SOA is a laser amplifier that, as with a semiconductor laser oscillator, excites an active layer in a semiconductor with current.

In an optical cable system for communication, a configuration that performs bidirectional communication by use of two (a pair of) optical fibers as an optical fiber pair is generally used. The optical fiber pair is also referred to as a fiber pair (hereinafter, "FP"). Since a general optical amplifier includes an optical isolator at an input/output port, the optical amplifier is capable of amplifying only an optical signal in one direction. An optical amplification repeating device for one fiber pairs has two optical amplifiers whose direction of propagation matches that of each optical fibers. That is, an optical amplification repeater device for a fiber pair has two optical amplifiers having transmission directions opposite to each other.

A configuration that transmits optical signals in both directions through an optical fiber is also used for some limited communication uses. For an optical amplification repeater device in such a case, a configuration described in FIG. 1B in PTL 1 is typically used. Hereinafter, the configuration is referred to as a single-core bidirectional configuration.

Although, in the disclosed technology, a directional optical coupler is used as a method for separating a bidirectional optical signal into unidirectional optical signals and coupling the optical signals again, a method of using an optical circulator as described in PTL 2 is also well known.

On the other hand, recent years, development of an optical fiber sensing system using an optical fiber as a sensor has advanced, and various applications of such an optical fiber sensing system have been proposed. Among optical fiber sensing technologies, in particular, a method of subjecting Rayleigh backscattered light generated in an optical fiber to signal processing and sophisticated analysis has considerably advanced. As used herein, the backscattered light is return light related to probe light, which is an optical signal for sensing that is input to an optical fiber for optical fiber sensing. Hereinafter, the "optical fiber sensing" is also referred to as "sensing".

A method of measuring only power of backscattered light is referred to as optical time domain reflectometry (OTDR) and is widely used for health assessment of transmission lines. What is to be detected in the health assessment is an abnormal increase in loss in a transmission line, a disconnection of a transmission line, or the like and is not a phenomenon that temporally changes from moment to moment, such as acoustic vibration. Therefore, in the OTDR measurement, a method for improving an SN ratio by performing measurement a large number of times and averaging measured data is used at the same time. As used herein, "SN ratio" is an abbreviation for "signal to noise ratio".

In contrast, in the optical fiber sensing technology, not only power of return light but also a phase and a polarization state of return light are closely analyzed. When compared with a simple OTDR, measurement substantially at high speed in a wide band is performed. Such measurement enables various types of information, such as sound, vibration, strain, and temperature, that points of an optical fiber sense to be acquired.

A typical configuration of signal transmission in an optical fiber sensing system is a single-core bidirectional configuration described afore. This is because the optical fiber sensing system, as with the OTDR, has a configuration in which probe light propagates in an optical fiber that is a sensing medium and, at the same time, backscattered light becomes reflected return light, propagates in the same optical fiber in the opposite direction, and returns.

A range in which the optical fiber sensing system is able to perform sensing has an upper limit typically at approximately 50 km due to transmission loss that an optical fiber has. In order to achieve sensing over longer distance, a configuration using an optical amplifier that compensates for loss in an optical fiber has been proposed.

In FIG. 3A in PTL 2, a technology of arranging an optical amplification repeater device of a single-core bidirectional type at a location at which probe light weakens due to attenuation and compensating for loss by optically exciting the optical amplification repeater device remotely is disclosed.

A technology of, in an optical cable system for communication that performs communication by use of a fiber pair, disposing a dedicated return light circuit inside an optical amplification repeater device in order to achieve health monitoring of transmission lines using the OTDR is widely used (see, for example, PTL 3 and NPL 1).

It is generally known that there are two configurations for combining the reflected return light into the line on the opposite side after separation: one configuration uses the output side of the optical amplifier on the opposite side as the combining point, and the other configuration uses the input side of the optical amplifier as the combining point.

FIGS. 1A and 1B is a conceptual diagram illustrating such two types of multiplexing points. FIGS. 1A and 1B schematically illustrate a configuration in which the multiplexing is performed on the output side of an optical amplifier and a configuration in which the multiplexing is performed on the input side of an optical amplifier, respectively.

A case is assumed where, in the configuration illustrated in FIG. 1A, an OTDR is installed in a not-illustrated terminal station on the right side and pulsed light output from the OTDR is transmitted through an optical fiber 72. In this case, a portion of return light of the OTDR pulsed light, which is generated on the left side of a coupler 92 in the optical fiber 72, is input to an optical fiber 73 by the coupler 92. The return light is multiplexed with light transmitted through an optical fiber 71 by a coupler 91, is transmitted through the optical fiber 71, returns to the OTDR, and is measured.

Likewise, another case is assumed where an OTDR is installed in a not-illustrated terminal station on the left side and pulsed light output from the OTDR is transmitted through the optical fiber 71. In this case, return light of the OTDR pulsed light, which is generated on the right side of the coupler 91 in the optical fiber 71, is input to the optical fiber 73 by the coupler 91, multiplexed with light transmitted through the optical fiber 72 by the coupler 92, is transmitted through the optical fiber 72, returns to the OTDR, and is measured.

As described above, in the configuration illustrated in FIG. 1A, weak return light is transmitted to a predetermined section without amplification. Therefore, the configuration illustrated in FIG. 1A has a drawback that return light is likely to be obscured by noise. However, the configuration illustrated in FIG. 1A requires only one return light path, that is, the optical fiber 73, to be installed. Since the configuration does not require an optical component in which loss occurs to be inserted on the input side of an optical amplifier, the configuration does not deteriorate a noise figure of a repeater.

A case is also assumed where, in the configuration illustrated in FIG. 1B, an OTDR is installed in a not-illustrated terminal station on the right side and pulsed light output from the OTDR is transmitted through the optical fiber 72. In this case, return light of the OTDR pulsed light, which is generated on the left side of a coupler 95 in the optical fiber 72, is transmitted in the rightward direction through the optical fiber 72. The return light is input to an optical fiber 74 by the coupler 95. The return light, after having been multiplexed with light transmitted through the optical fiber 71 by a coupler 93 and amplified by an optical amplifier 81, is transmitted through the optical fiber 71 in the rightward direction, returns to the OTDR, and is measured.

Likewise, another case is assumed where an OTDR is installed in a not-illustrated terminal station on the left side and pulsed light output from the OTDR is transmitted through the optical fiber 71. In this case, return light of the OTDR pulsed light, which is generated on the right side of a coupler 94 in the optical fiber 71, is transmitted in the leftward direction through the optical fiber 71. After a portion of the return light is input to an optical fiber 75 by the coupler 94, multiplexed with light transmitted through the optical fiber 72 by a coupler 96, and amplified by an optical amplifier 82, the return light is transmitted through the optical fiber 72 in the leftward direction, returns to the OTDR, and is measured.

In the case of the configuration in FIG. 1B, the repeater device is required to include two return light paths, namely the optical fibers 74 and 75, contrary to the configuration in FIG. 1A. Since an optical component in which loss occurs is inserted on the input side of an optical amplifier, the configuration has a drawback that the noise figure of the repeater significantly deteriorates. However, in the case of this configuration, weak reflected return light, after having been amplified, is transmitted in one section to the next optical amplification repeater device. Therefore, the configuration has an advantage that reflected return light is unlikely to be obscured by noise.

CITATION LIST

Patent Literature

[PTL 1] Japanese Patent No. 3093510
[PTL 2] U.S. Pat. No. 7,595,865
[PTL 3] Japanese Patent No. 2712103

Non Patent Literature

[NPL 1] Hikari Kaitei Cable, PARADE Inc., ISBN 978-4-434-14494-3, May 2010

SUMMARY OF INVENTION

Technical Problem

There is no disclosure of a method for causing an optical cable system that includes an optical amplification repeater device and performs general communication to also have an optical fiber sensing function.

For example, PTL 3 and NPL 1 disclose methods for performing health monitoring of transmission lines by use of the OTDR in an optical cable system for communication that performs communication with a fiber pair. However, the methods disclosed in PTL 3 and NPL 1 are not a method of remotely measuring information about vibration or temperature that an optical fiber cable senses.

PTL 2 discloses a method for extending a sensing range through application of an optical amplification repeater device to a system that remotely measures information about vibration or temperature that an optical fiber cable senses. However, the method disclosed in PTL 2 is a method relating to a system dedicated to sensing, and coexistence with an optical communication signal is not considered in the method.

An object of the present invention is to provide a cable system and the like that enable extension of a sensing range through application of an optical amplification repeater device to an optical fiber sensing system. Another object of the present invention is to provide a cable system and the like in which an optical communication system that has achieved long-distance communication by use of an optical amplification repeater device and an optical fiber sensing system coexist.

Solution to Problem

A cable system of the present invention is a cable system that uses a cable including a plurality of optical fibers for optical fiber sensing of an environment surrounding the cable and includes an optical amplification repeater device that compensates for transmission loss including loss in the optical fibers, in which the optical fiber sensing is sensing in which probe light, which is transmitted light used for the optical fiber sensing, is transmitted through one of the optical fibers and backscattered light that is related to the probe light and arrives from the optical fiber is received and analyzed, to at least one end of the cable, a transmission/reception device for sensing that performs the optical fiber sensing is connected, and, in the optical fiber having a function of the optical fiber sensing, when there is a first wavelength band in which a wavelength of an optical signal used for a use other than the sensing is assigned, the first wavelength band and a second wavelength band that is a wavelength of the probe light and the backscattered light are arranged in such a way as to be different from each other, an optical amplification unit included in the optical amplification repeater device, the optical amplification unit performing amplification and repeating of light transmitted through the optical fiber having a function of the optical fiber sensing, includes a first amplifier and a second amplifier that amplify rays of light propagating in opposite directions to each other, and each of the probe light and the backscattered light is amplified by one of the first amplifier and the second amplifier.

Advantageous Effects of Invention

A cable system and the like of the present invention enable extension of a sensing range through application of an optical amplification repeater device to an optical fiber sensing system. The cable system and the like of the present invention further provide a cable system in which an optical communication system that has achieved long-distance communication by use of an optical amplification repeater device and an optical fiber sensing system coexist.

BRIEF DESCRIPTION OF DRAWINGS

FIGS. 1A and 1B are conceptual diagrams describing two modes relating to a multiplexing point in a communication system that performs communication by use of a fiber pair;

EXAMPLE EMBODIMENT

Figure 1B:
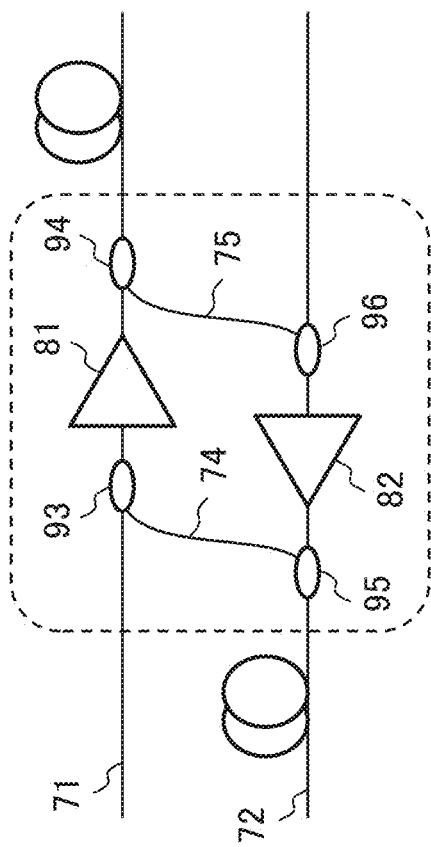

Example embodiments will be described with reference to the drawings hereinbelow. Note that, in the following description and drawings, omission and simplification are made as appropriate in consideration of easiness in understanding the description. In addition, in the following drawings, overlapping description is omitted as needed.

Terms used in the description of example embodiments will be formally defined. An optical amplifier, in principle, refers to the basic unit of optical amplification to and from which an optical fiber core is input and output. In some cases, the optical amplifier is of a single-core bidirectional type. In some cases, a single-core bidirectional type optical amplifier is configured as one amplifier by combining a plurality of optical amplifiers.

An optical amplification unit refers to a set of a plurality of optical amplifiers to and from which a fiber pair (FP) is input and output.

An optical amplification repeater device is, in principle, an amplification repeater device to and from which an optical cable is input and output and refers to an amplification repeater device in which optical amplification units the number of which corresponds to the number of FPs included in the optical cable are housed.

First Example Embodiment

The present example embodiment is an example embodiment relating to a cable system in which a communication optical signal, probe light, and backscattered light are transmitted through the same optical fiber.

[Configuration and Operation]

A configuration example of a cable system 10 according to the present example embodiment will be described with reference to FIG. 2. In this example, the cable system 10 is described using a point-to-point network configuration, which is the simplest configuration. The cable system 10 includes major components including a terminal station device 11, an optical cable 21, optical amplification repeater devices 31 to 3n, and the like.

Lines illustrated in the optical cables 21 indicate optical fibers. The optical cable 21 includes eight optical fiber. The optical fibers constitute four FPs, namely FPs 411 to 414. As used herein, "FP" is an abbreviation for "fiber pair". The cable system 10 is a system including four FPs. In each optical fiber, optical transmission of a wavelength division multiplexed communication optical signal is performed. Regarding wavelength division multiplexing separators and transponder groups, which are major internal components of the terminal station devices 11 and 12, only wavelength division multiplexing separators 112 and 122 and transponder groups 111 and 121 that are connected to the FP 411 are illustrated. Illustration of wavelength division multiplexing separators and transponder groups connected to the FPs 412 to 414 is omitted in order to avoid complexity of the drawing.

In this example, the FP 414, which is a FP illustrated in the bottom row in the drawing, performs optical fiber sensing in addition to general optical communication. In the terminal station devices 11 and 12, ITGs 119 and 129, which are interrogators (ITGs), are connected to one of the optical fibers in the FP 414 from which wavelength division multiplexed main signal light (communication signal light) is received, respectively.

Each interrogator (ITG) transmits afore-described probe light, which is transmitted light for sensing, to an optical fiber. The probe light is sometimes referred to as probe pulsed light. The ITG receives and analyzes Rayleigh backscattered return light (hereinafter, simply referred to as "backscattered light") of the probe light, which is returned from the optical fibers. The interrogators (ITGs) are well-known devices that perform the above-described operation.

In wavelength assignment (assignment of wavelength) to the FP 414, a wavelength band of probe light, which is transmitted from each of the ITGs 119 and 129, and a wavelength band used for a communication optical signal are separately assigned. As used herein, the communication optical signal is an optical signal used in general optical fiber communication.

Figure 3:
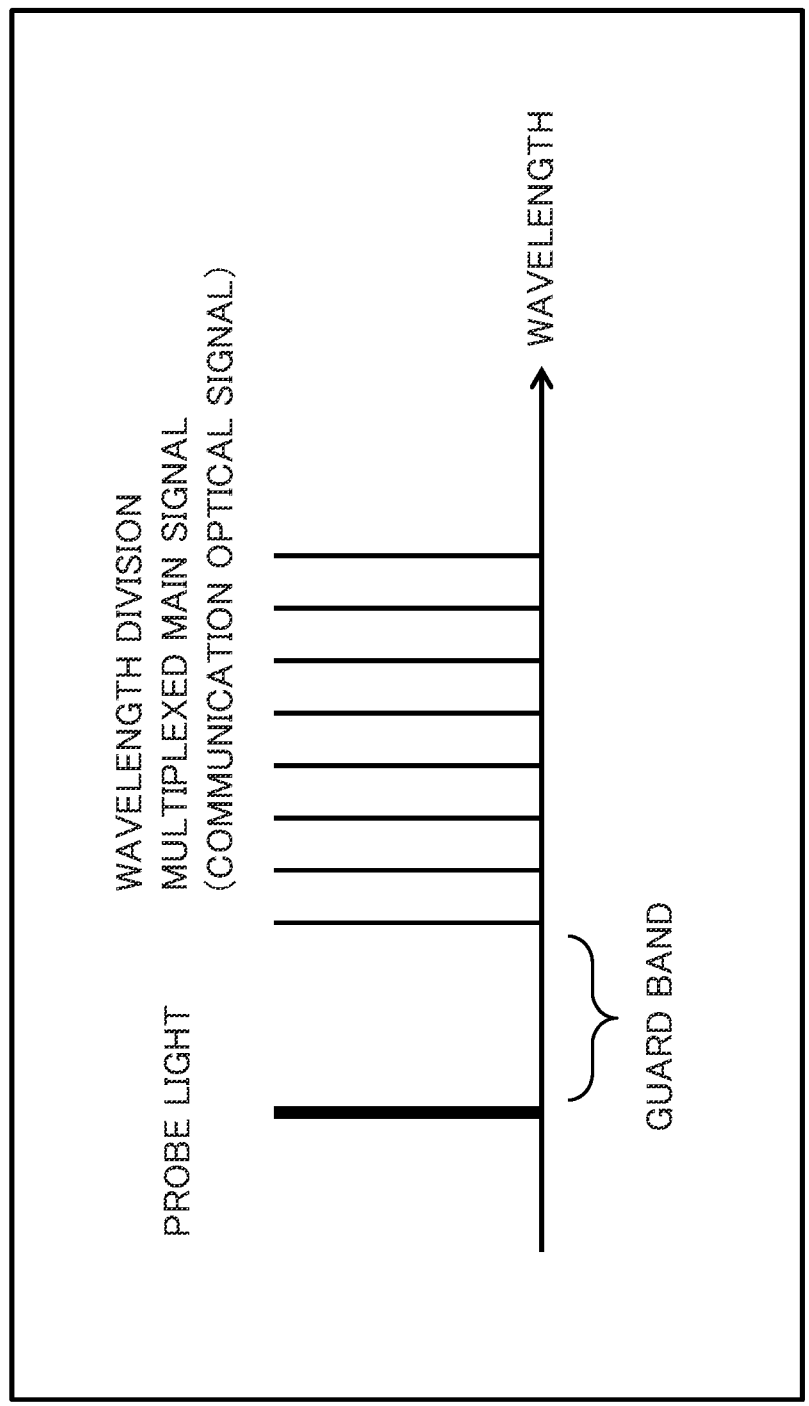
FIG. 3 is a diagram schematically illustrating a wavelength assignment example in the first example embodiment.

In FIG. 3, an example of wavelength assignment relating to the ITGs 119 and 129 is schematically illustrated. The wavelength of the probe light transmitted to an optical fiber from each of the ITGs 119 and 129 is assigned separately from the wavelength band of the communication optical signal. Between the wavelength of the probe light and the wavelength band of the communication optical signal, which is a wavelength division multiplexed main signal, an appropriate guard band is interposed.

Figure 2:
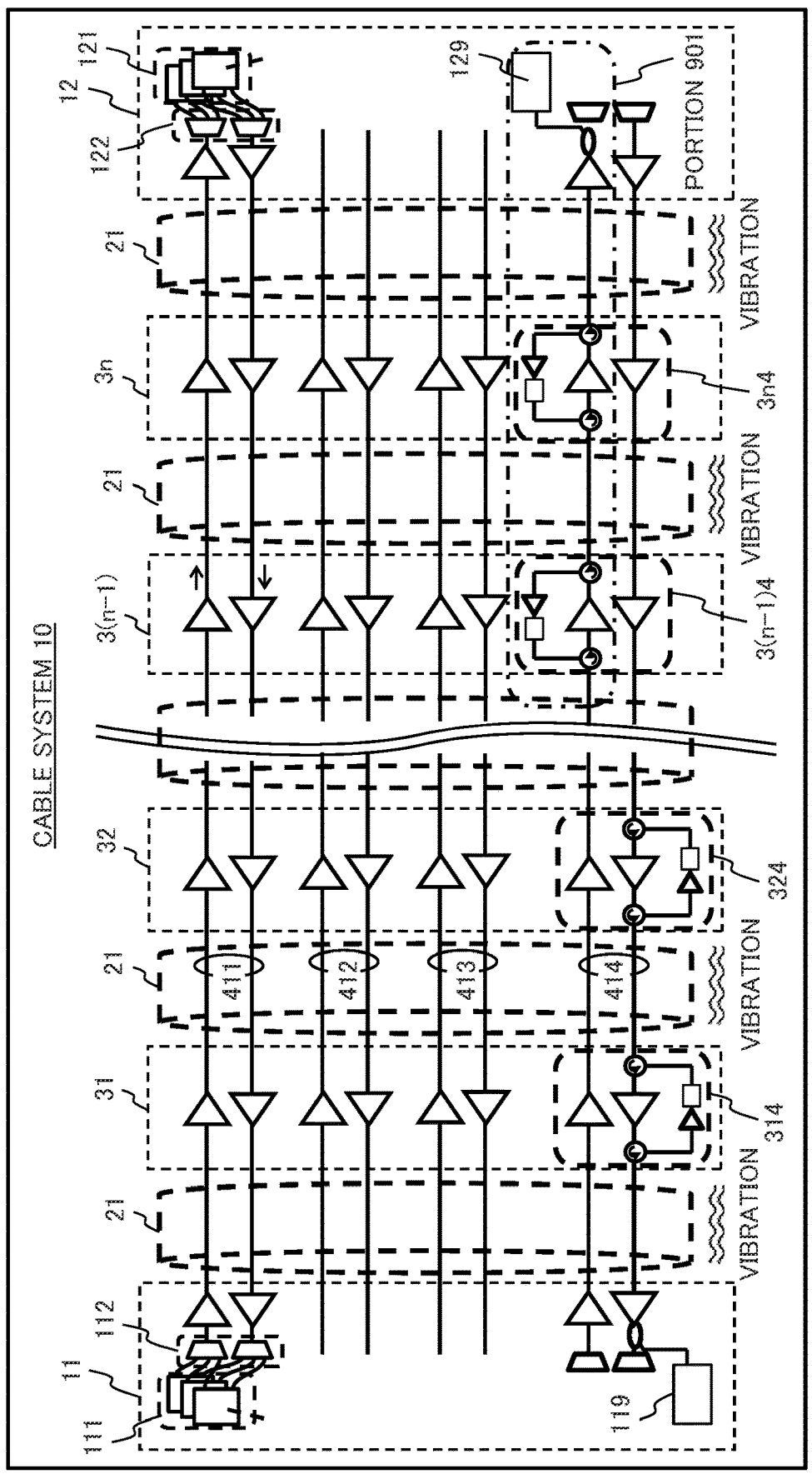
FIG. 2 is a conceptual diagram illustrating a configuration example of a cable system according to a first example embodiment.
Figure 4:
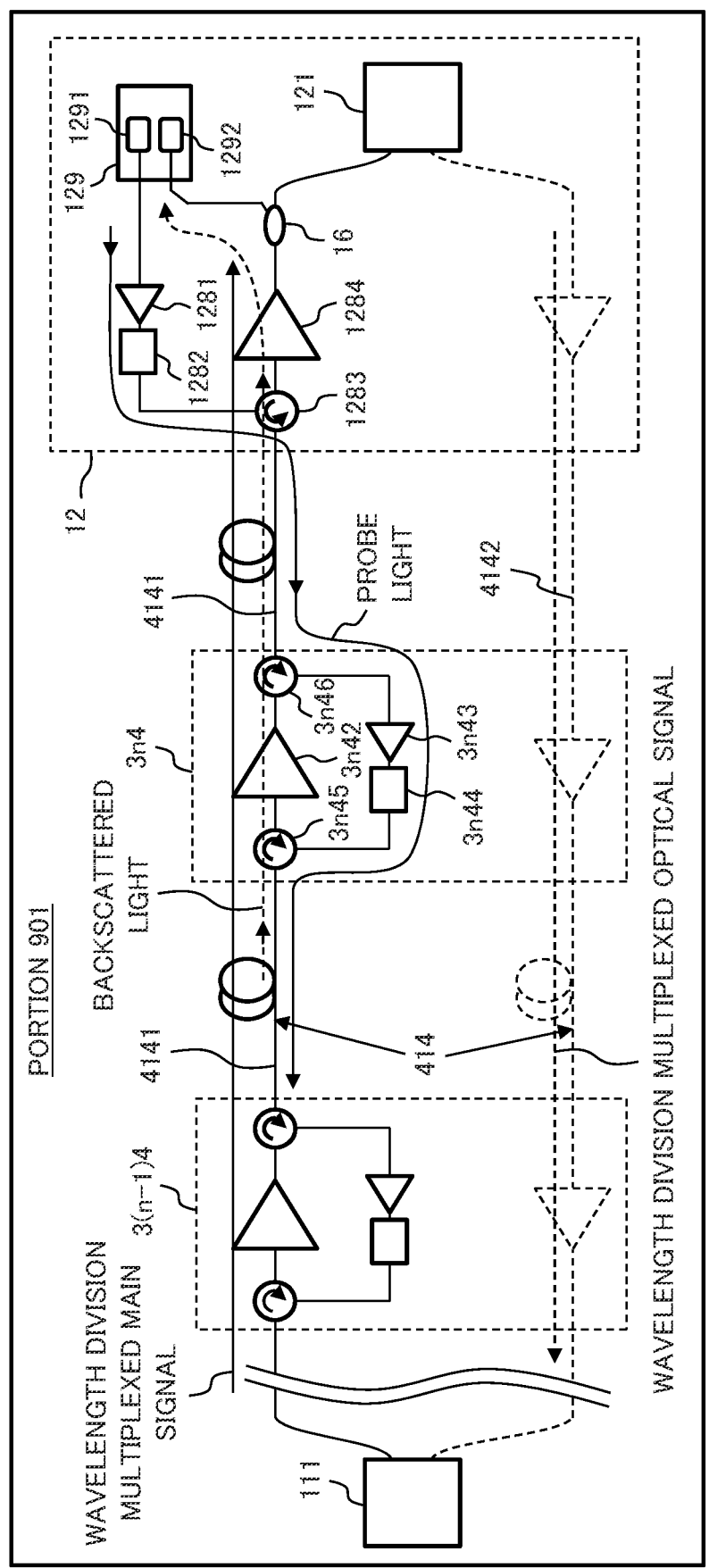
FIG. 4 is an enlarged view of a portion 901 in FIG. 2.

An enlarged view of a portion 901 that is a portion enclosed by an alternate long and short dash line in FIG. 2 is illustrated in FIG. 4. The communication optical signal, which is a wavelength division multiplexed main signal, is transmitted through an optical fiber 4141 from the left side to the right side in FIG. 4. The probe light transmitted from the ITG 129 is transmitted in the opposite direction to the direction in which the communication optical signal is transmitted, that is, from the right side to the left side in FIG. 4. Optical amplification units 3(n−1)4 and 3n4 are units that amplify and repeat light transmitted through the FP 414 within the repeater devices that compensate for transmission loss. Optical amplifiers disposed on the optical fiber 4141 side in FIG. 4 within the optical amplification units 3(n−1)4 and 3n4 are bidirectional optical amplification repeaters that amplify bidirectional light transmitted through the optical fiber 4141.

A path on the upper side of the optical amplifiers disposed on the transmission line 4141 side (a path that passes an optical amplifier 3n42) within the optical amplification unit 3n4 is a path in which amplification and repeating of a communication optical signal, which is a wavelength division multiplexed main signal, are performed by the optical amplifier 3n42. On the other hand, a path on the lower side (a path that passes an optical amplifier 3n43) is a path in which amplification and repeating of probe light is performed. In the lower side path, a filter 3n44, which is a wavelength selection filter, is inserted. The filter 3n44 passes only light in the wavelength band of the probe light and prevents passing of light in a wavelength band other than the wavelength band of the probe light.

A circulator 3n45 is a device for inputting light transmitted through the optical fiber 4141 in the rightward direction to the optical amplifier 3n42 as well as inputting light from the filter 3n44 to the optical fiber 4141 in such a way that the light is transmitted in the leftward direction. A circulator 3n46 transmits light from the optical amplifier 3n42 in the rightward direction as well as inputs light input from the right side to the optical amplifier 3n43.

In FIG. 2, optical amplification repeater devices located within a range of sensing performed by the ITG 129 have the same configuration as that of the optical amplification unit 3n4 as optical amplification units for the FP 414.

Optical amplification repeater devices located within a range of sensing performed by the ITG 119 also have the same configuration as that of the optical amplification unit 3n4 as optical amplification units for the FP 414. Since the directions of transmission and reception in the optical fibers 4141 and 4142 are opposite to each other between the terminal station device 11 side and the terminal station device 12 side, optical amplifiers disposed on the optical fiber 4142 side in the optical amplification units (314, 324, and so on) located within the sensing range of the ITG 119 are single-core bidirectional amplifiers. Since operation of the optical amplifiers are the same as that of the optical amplifiers on the ITG 129 side, a description thereof will be omitted.

Backscattered light generated in the optical fiber 4141, which is a transmission line, is transmitted in the same direction as the communication optical signal, which is a wavelength division multiplexed main signal, amplified and repeated by the optical amplification unit 3n4, and received and analyzed by the ITG 129.

The ITG 129 acquires environmental information that points on the optical cable 21 are sensing, an example of which is illustrated in FIG. 2, through the analysis by the ITG 129.

A transmission unit 1291 included in the ITG 129 in FIG. 4 is a unit that transmits probe light to the optical fiber 4141. A reception unit 1292 is a unit that receives backscattered light from the optical fiber 4141 and analyzes environmental information acquired by the optical fiber 4141, based on the backscattered light.

In FIG. 4, a configuration including optical amplifiers 1281 and 1284, a filter 1282, a circulator 1283, a wavelength selection coupler 16, and optical fibers connecting the constituent components, which are disposed in the terminal station device 12, is a bidirectional pair of optical amplifiers and connection paths between the ITG 129 and the optical fiber 4141. The connection paths transmit probe light transmitted by the transmission unit 1291 to the optical fiber 4141 as well as guide backscattered light from the optical fiber 4141 to the reception unit 1292.

The connection paths may be achieved by the same configuration as that of a single-core bidirectional type optical amplifier. In that case, since multiplexing and demultiplexing become unnecessary, a configuration after such unnecessary multiplexing and demultiplexing are eliminated is the connection paths.

An interval between optical amplification repeater devices in a general wavelength division multiplexing communication system is as long as 60 to 80 km. Therefore, incident power of probe light needs to be set high, and, since the probe light is pulse-shaped, peak value power becomes extremely high. When a communication optical signal, which is a wavelength division multiplexed main signal, is caused to propagate collaterally with probe light in such a situation, there is a possibility that deterioration occurs in the communication optical signal due to nonlinear optical effect in the optical fiber.

Therefore, in the configuration illustrated in FIGS. 2 and 4, probe light is transmitted in the opposite direction to that of a communication optical signal. This configuration causes deterioration in a communication optical signal to be substantially reduced.

On the other hand, power of backscattered light is lower than that of a communication optical signal, and backscattered light is not pulse-shaped. Therefore, even when backscattered light is co-propagate with a communication optical signal, there is little possibility that the transmission serves as a deterioration factor.

While, as described afore, eight optical fibers in total are included in the optical cable 21 in FIG. 2, the sensing function is merged to only the optical fiber 4141 on the terminal station device 12 side and only the optical fiber 4142 on the terminal station device 11 side. The reason for the configuration is that, when vibration, temperature, or the like in an environment around the optical fiber cable is sensed, substantially the same value can be acquired even when the sensing is performed using another optical fiber in the optical fiber cable. Therefore, it is considered that it is sufficient to perform the optical fiber sensing by use of only a representative optical fiber. Configuring the cable system 10 as described above enables a cost at the time of adding a component for a sensing signal to an optical amplification repeater device for communication to be suppressed from increasing. It is also possible to suppress an increase rate of power consumption in the repeater devices.

In the optical fiber sensing using backscattered light, there is a fundamental upper limit to sensible distance. Therefore, the sensible distance is restricted even when loss is sufficiently compensated for by the optical amplification repeating. For example, when a sampling rate is 50 Hz, the upper limit of the sensible distance is approximately 2000 km. In addition to the above, the sensible distance is restricted by SN deterioration, nonlinear deterioration, or the like. When, because of this restriction, the sensing from one end cannot measure the whole cable length of the optical cable, performing the sensing from both ends as illustrated in FIG. 2 enables the deficiency in the measurement to be eliminated to some extent. Even when the sensing from one end can measure the whole cable length, performing the sensing from both ends also enables redundancy to be achieved.

Advantageous Effects

In the present example embodiment, a configuration that causes an optical transmission system including an optical amplification repeater device to also have a function of sensing a surrounding environment by use of an optical cable as a sensor is provided.

In the cable system of the present example embodiment, probe light is transmitted through an optical fiber in the opposite direction to that of a communication optical signal. This configuration enables deterioration in the communication optical signal caused by the probe light to be reduced. In the cable system described above, an amplifier that amplifies probe light transmitted in the opposite direction to that of a communication optical signal is connected to an amplification unit for the optical fiber in parallel with an optical amplifier that amplifies and repeaters the communication optical signal. The cable system of the present example embodiment including the above-described configuration enables environmental information of a portion of the optical cable beyond the optical amplification repeater device to be sensed.

Use of the cable system of the present example embodiment enables influence of sensing light and a communication optical signal deteriorating each other when the sensing light and the communication optical signal are wavelength-division-multiplexed to be suppressed more effectively. Since an optical fiber and an amplification unit can be shared by communication and sensing, neither an optical fiber dedicated for sensing nor an amplification unit dedicated for the optical fiber need to be disposed, and the cable system of the present example embodiment thus excels in economic efficiency. Further, since it is sufficient to apply the configuration of the present example embodiment to at least one core within a cable, it is possible to prevent a cost to add the sensing function from increasing.

Further, in the cable system of the present example embodiment, probe light is transmitted through each optical fiber in a closed manner. Therefore, the above-described cable system has an advantage that it is easier to design a network than a configuration using a fiber pair, which will be described later.

Second Example Embodiment

The present example embodiment is an example embodiment relating to a cable system in which, while a communication optical signal, probe light, and backscattered light are transmitted through a fiber pair (FP), optical fibers through which the rays of light are respectively transmitted can be different from each other within the FP.

[Configuration and Operation]

Figure 5:
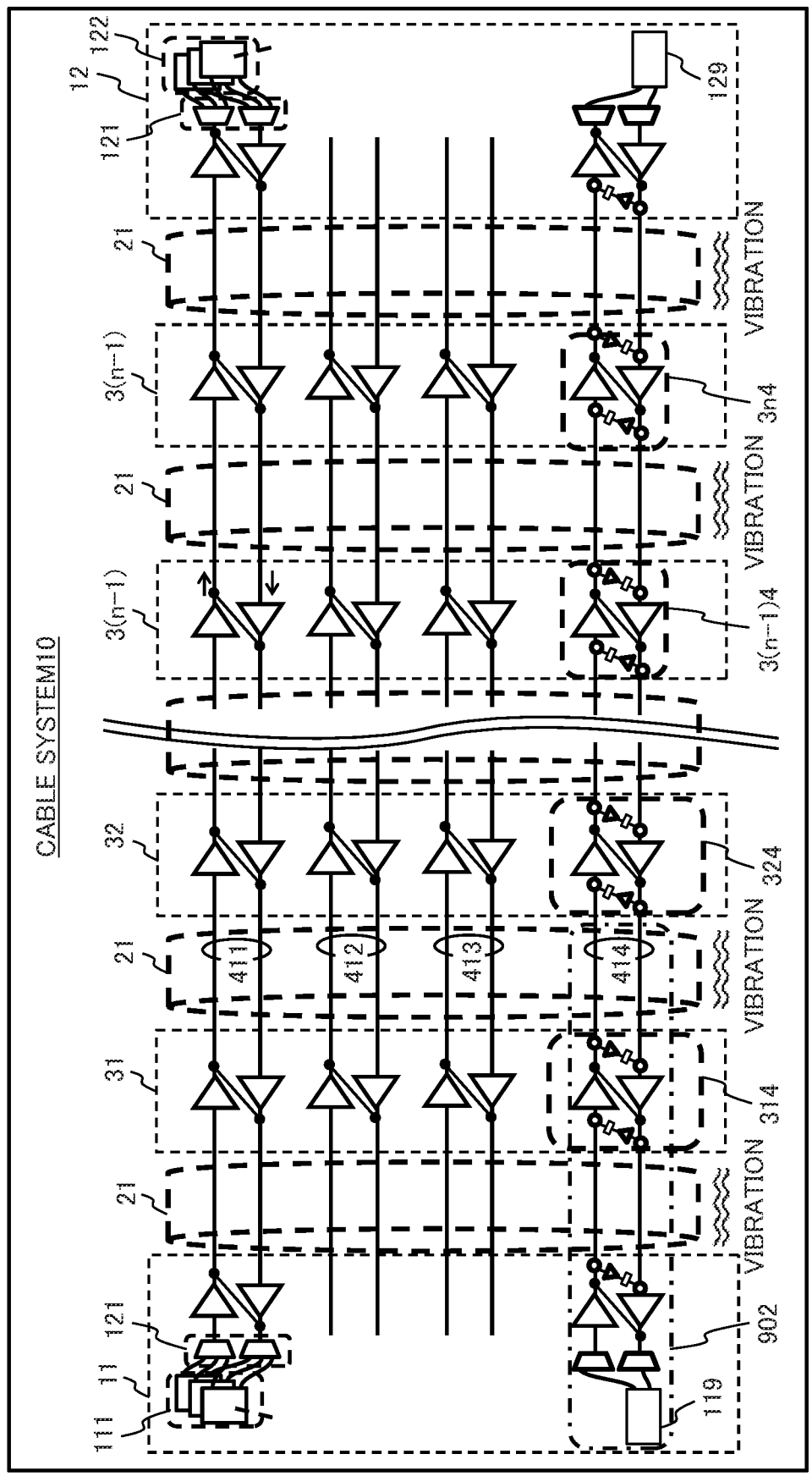
FIG. 5 is a conceptual diagram illustrating a first configuration example of a cable system of a second example embodiment.

First, with reference to the FIG. 5, a configuration example of a cable system 10 according to the present example embodiment will be described. The cable system 10 illustrated in FIG. 5 is, as with the cable system 10 illustrated in FIG. 2, a cable system that has a point-to-point network configuration, which is the simplest configuration. The cable system 10 is, as with the cable system 10 illustrated in FIG. 2, a system including four FPs.

In the configuration example in FIG. 5, each of optical amplification units in optical amplification repeater devices 31 to 3n includes a path for return light for monitoring a transmission line, which was described in Background Art and is illustrated in FIG. 1A and FIG. 1B. Each of the paths for return light is schematically illustrated by black dots and a straight line.

A FP 414, which is a FP illustrated in the bottom row in the drawing, performs general optical communication as well as optical fiber sensing. To the FP 414, an ITG 119 in a terminal station device 11 and an ITG 129 in a terminal station device 12 are also connected.

Figure 6:
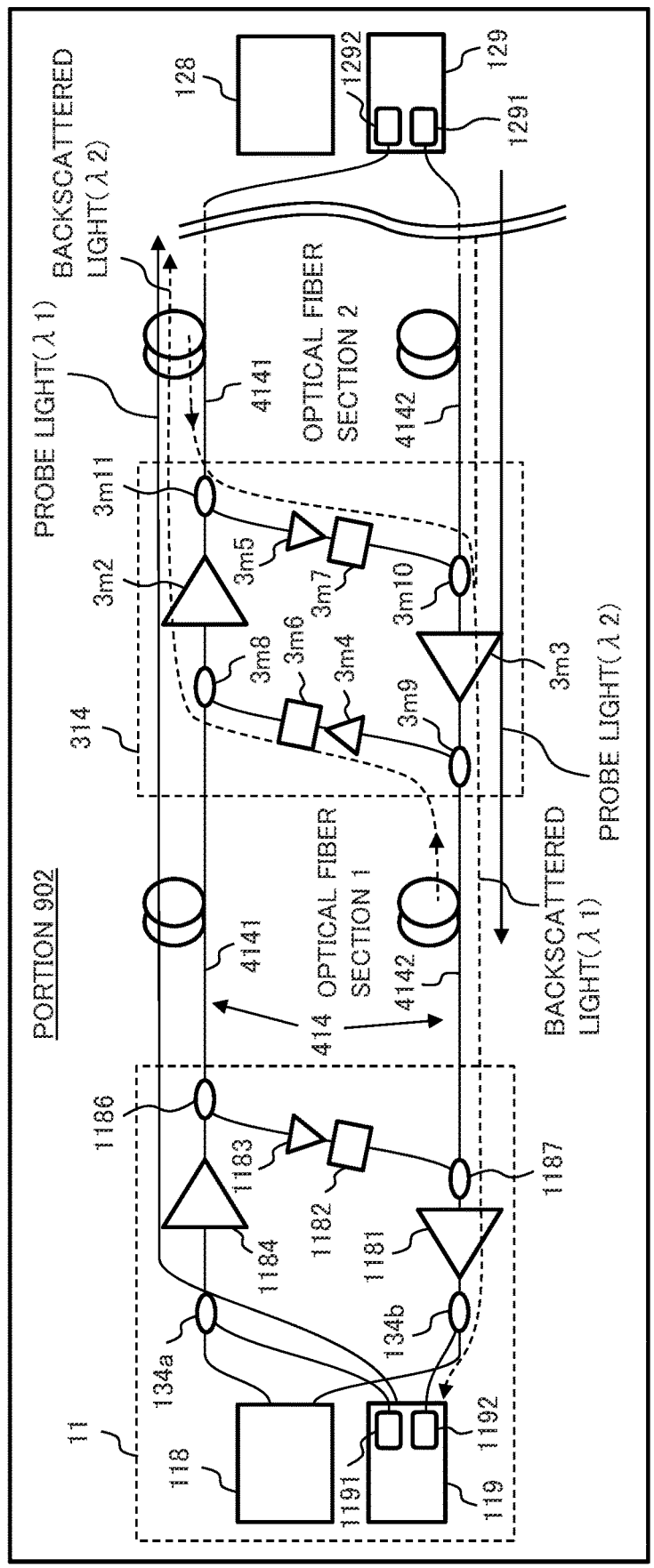
FIG. 6 is an enlarged view of a portion 902 in FIG. 5.
Figure 8:
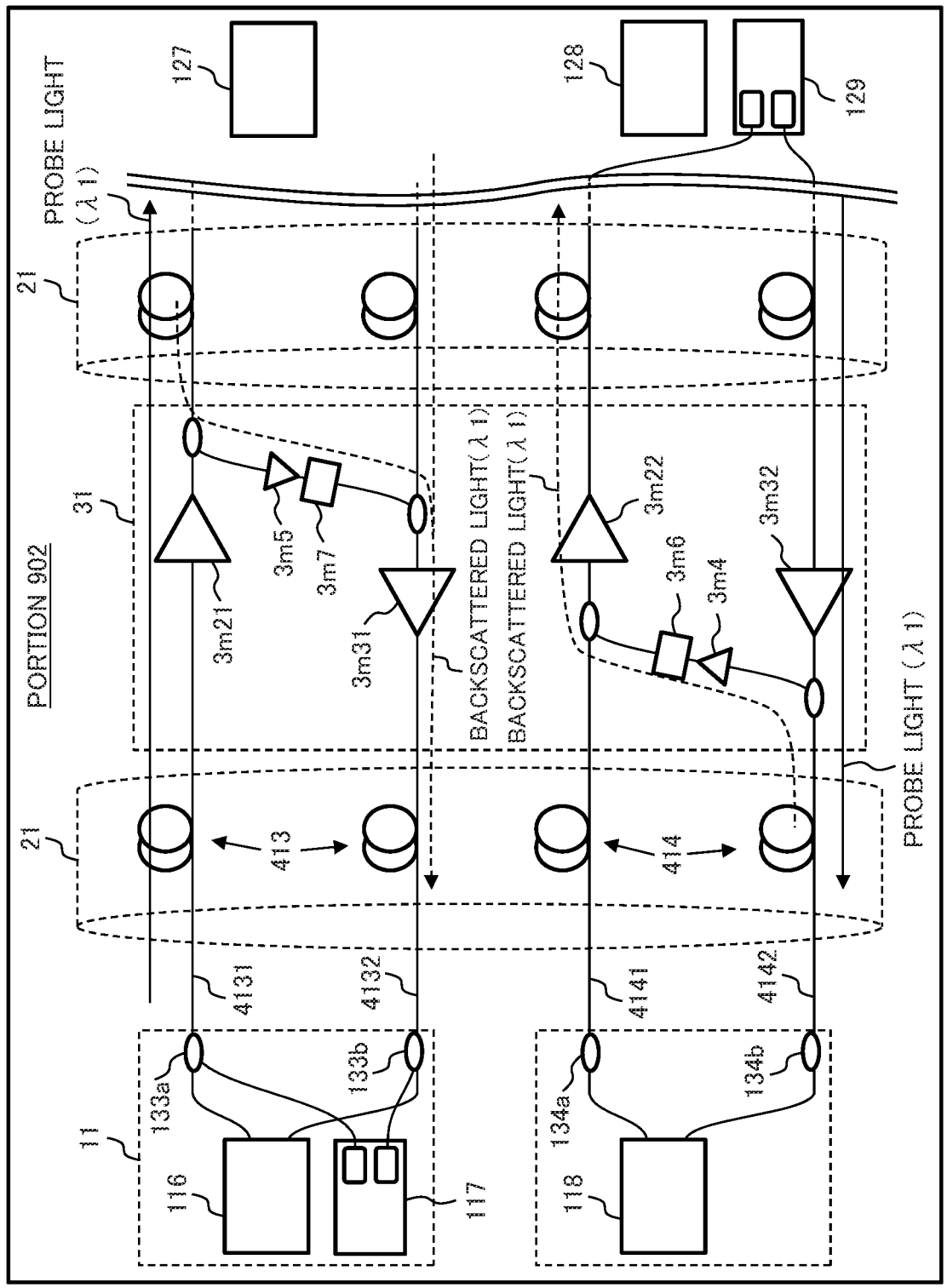
FIG. 8 is an enlarged view illustrating the portion 902 in FIG. 5 and describing a second configuration example of the cable system of the second example embodiment.
Figure 9:
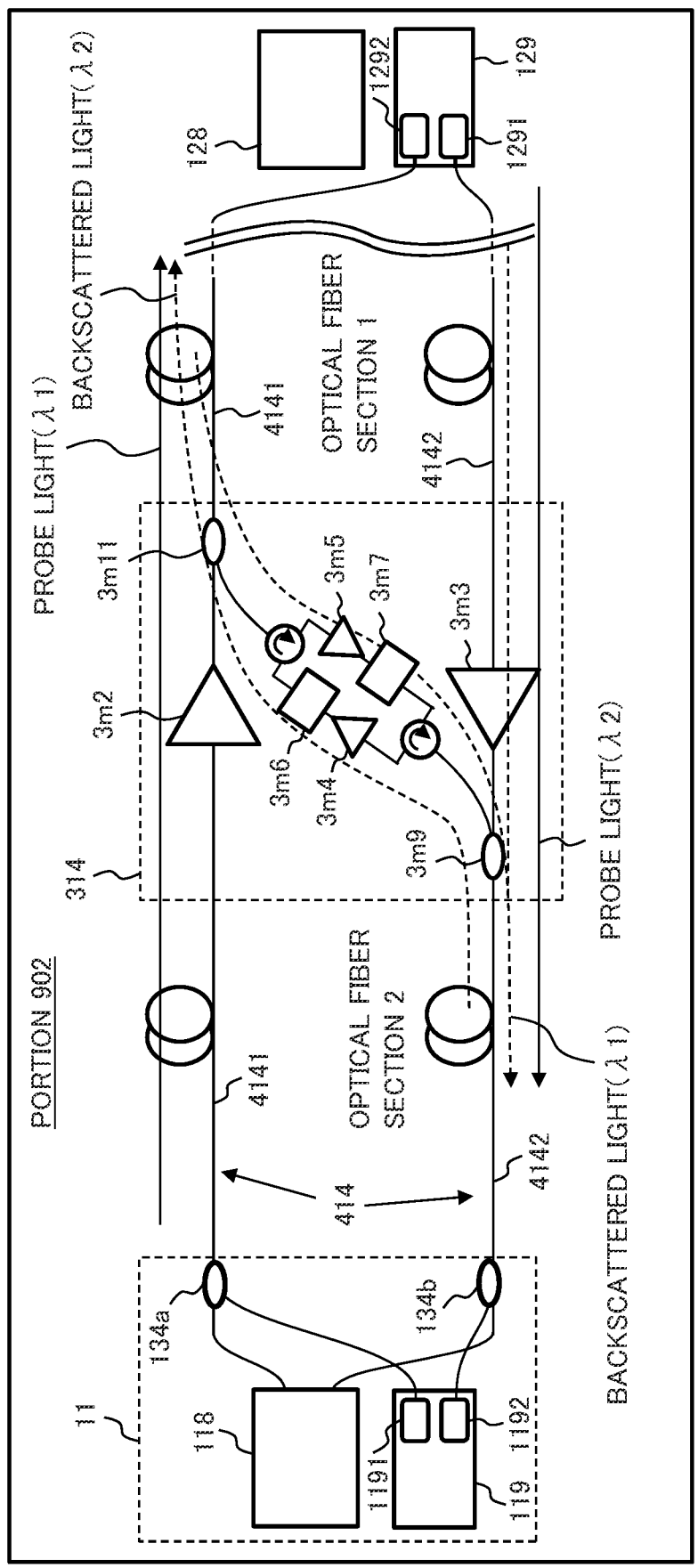
FIG. 9 is an enlarged view illustrating the portion 902 in FIG. 5 and describing a third configuration example of the cable system of the second example embodiment.

An enlarged view of a portion 902, which is illustrated by an alternate long and short dash line in FIG. 5, is illustrated in FIG. 6. In FIG. 6, in addition to the portion 902, transponder groups 118 and 128, which are connected to the FP 414, and the ITGs 119 and 129, which is illustrated in FIG. 5, are illustrated. In FIGS. 6, 8, and 9, illustration of return light paths for the OTDR is omitted in order to avoid complexity of the drawing. Each of the return light paths for the OTDR is a portion that is illustrated by black dots and a straight line in FIG. 5 and connects two (a pair of) optical fibers constituting a FP to each other. In FIGS. 6, 8, and 9, illustration of a flow of a communication optical signal, which is a wavelength division multiplexed main signal, is also omitted.

In FIG. 6, the ITGs 119 and 129 are connected to both ends of a FP in an opposing manner. Sensing wavelength of probe light from the ITG 119 and sensing wavelength of probe light from the ITG 129 are a wavelength $\lambda 1$ and a wavelength $\lambda 2$, respectively. In the configuration illustrated in FIG. 6, differentiating the sensing wavelengths of two opposing ITGs from each other as described above enables inconvenience in measurement caused by rays of light of the same wavelength overlapping each other to be avoided.

A transmission unit 1191 included in the ITG 119 in FIG. 6 is a unit that transmits probe light ($\lambda 1$) for sensing to an optical fiber 4141. A reception unit 1192 is a unit that receives backscattered light ($\lambda 1$), which is generated in the optical fiber 4141 and is transmitted by way of an optical fiber 4142, and analyzes environmental information acquired by the optical fiber 4141, based on the backscattered light.

A transmission unit 1291 included in the ITG 129 is a unit that transmits probe light ($\lambda 2$) to the optical fiber 4142. A reception unit 1292 is a unit that receives backscattered light (λ2), which is generated in the optical fiber 4142 and is transmitted by way of the optical fiber 4141, and analyzes environmental information acquired by the optical fiber 4142, based on the backscattered light.

In FIG. 6, a configuration including a coupler 1186, optical amplifiers 1181 and 1183, a filter 1182, a coupler 1187, and optical fibers connecting the constituent components is a bidirectional pair of optical amplifiers and a connection path between the ITG 119 and the FP 414. The connection path guides backscattered light from the optical fiber 4141, which is related to probe light transmitted by the transmission unit 1191 to the optical fiber 4141, to the reception unit 1192.

The probe light of the wavelength λ1 and the probe light of the wavelength λ2 are wavelength-division-multiplexed with communication optical signals, which are wavelength division multiplexed main signals, and transmitted through the optical fiber 4141 and the optical fiber 4142 collaterally with the communication optical signals, respectively.

A portion of backscattered light of the wavelength λ1 generated in the optical fiber 4141 within an optical fiber section 1 is separated by a coupler 3m11 of an optical amplification unit 314 and amplified by an optical amplifier 3m5, and, subsequently, bandwidth of the separated backscattered light is restricted to only a sensing wavelength band by a filter 3m7. Subsequently, the backscattered light is multiplexed with light transmitted through the optical fiber 4142 by a coupler 3m10, amplified by an optical amplifier 3m3, and subsequently transmitted through the optical fiber 4142 within an optical fiber section 2 toward the ITG 119 collaterally with a communication optical signal. In this configuration, pulse width of probe light is set sufficiently short lest the backscattered light overlap and interfere with other backscattered light from an optical fiber section located further to the right than the optical fiber section 1 when the backscattered light is multiplexed with light transmitted through the optical fiber 4142 by the coupler 3m10.

Likewise, a portion of backscattered light of the wavelength λ2 generated in the optical fiber 4142 within the optical fiber section 2 is separated by a coupler 3m9 and amplified by an optical amplifier 3m4, and, subsequently, bandwidth of the separated backscattered light is restricted to the sensing wavelength band by a filter 3m6. The backscattered light of the wavelength λ2 is further multiplexed with light flowing in the optical fiber 4141 by a coupler 3m8 and transmitted through the optical fiber 4141 toward the ITG 129 collaterally with a communication optical signal.

The transponder groups 118 and 128 in FIG. 6 are transponders connected to both ends of the FP 414 that are illustrated by single objects as aggregates. A wavelength selection coupler 134a is a device for multiplexing a communication optical signal from the transponder group 118 and probe light from the transmission unit 1191 with each other and transmitting the multiplexed light to the optical fiber 4141. A wavelength selection coupler 134b is a device for splitting and inputting light from the optical fiber 4142 to the transponder group 118 and the ITG 119.

Although the configuration in FIG. 6 resembles return light paths of the OTDR for line monitoring, the configuration has a feature that the optical amplifiers 3m4 and 3m5 and the filters 3m6 and 3m7 for wavelength selection are included. Since a target to be monitored in the OTDR is loss in a transmission line and state change of the transmission line is temporally slow, an SN ratio can be increased through a large number of times of averaging. Therefore, neither optical amplifier nor filter for wavelength selection need to be disposed in the return light paths of the OTDR for line monitoring. Rather, loss in the return light paths of the OTDR for line monitoring needs to be increased sufficiently large. This is because, since rays of wavelength division multiplexing communication light are not differentiated between the optical fiber 4141 side and the optical fiber 4142 side, there is a possibility that rays of backscattered light of the rays of wavelength division multiplexing communication light interfere with the rays of communication signal light on the opposite side and the interference causes a communication failure.

On the other hand, what is to be monitored by the optical fiber sensing is an environment surrounding an optical cable 21, such as vibration and sound, and, since the state of the environment sometimes changes temporally rapidly, repeating measurement and averaging measured values often cannot be performed. Therefore, an optical fiber sensing system is, by amplifying light, configured to be capable of maintaining a high signal level, preventing SN deterioration, and acquiring environmental information representing an environment without performing averaging or the like.

Figure 7:
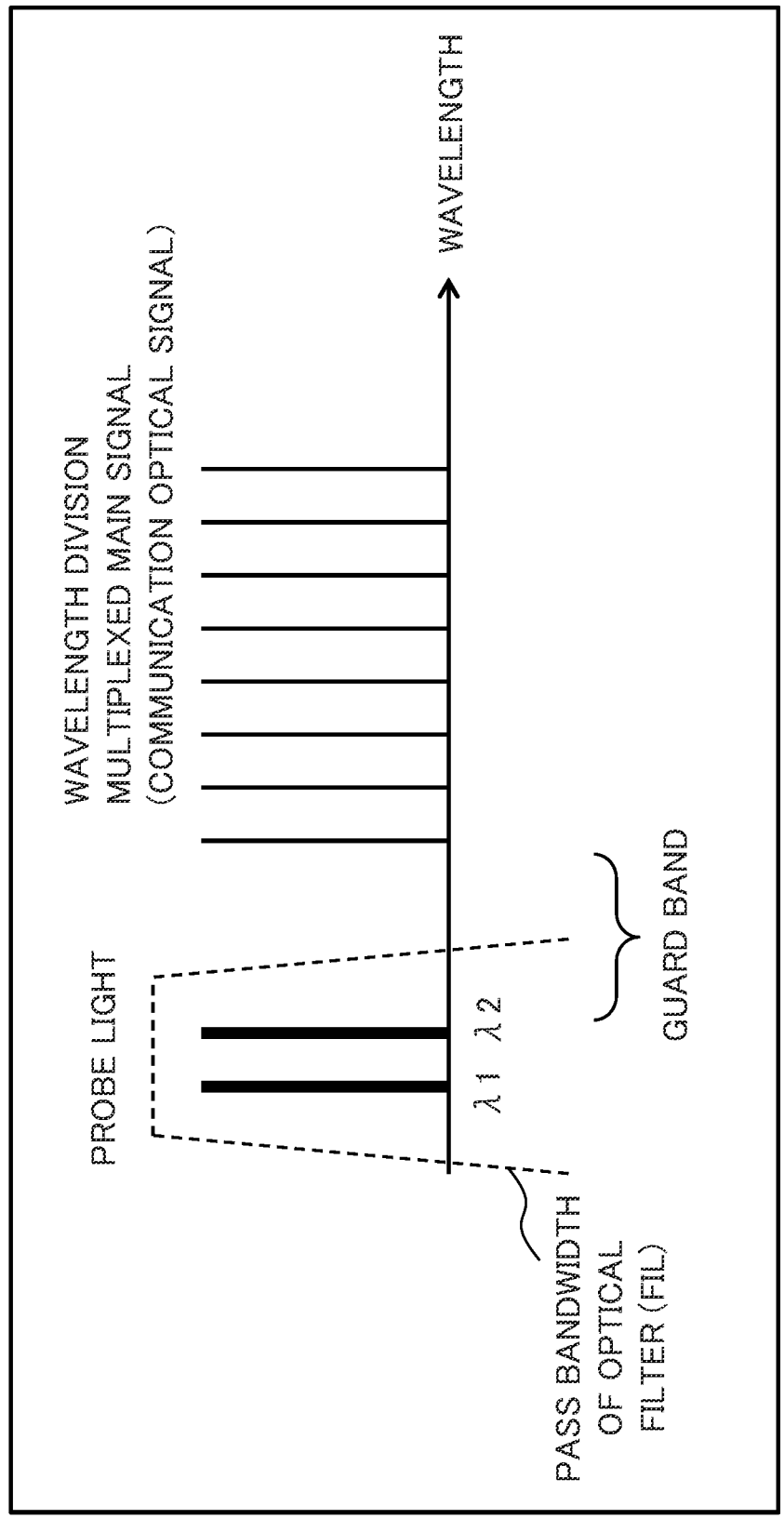
FIG. 7 is a diagram schematically illustrating a wavelength assignment example in the second example embodiment.

Wavelength assignment for the FP 414 in the present example embodiment is, as with the first example embodiment, performed with wavelengths used for sensing and a communication wavelength band separated from each other. In addition to the above, in the configuration in FIG. 6, since the ITGs 119 and 129 are connected to both ends of the FP 414, which is a fiber pair, in an opposing manner to each other, the wavelengths of rays of probe light to be transmitted need to be differentiated from each other. Therefore, the wavelength assignment for the FP 414 is, for example, achieved as illustrated in FIG. 7. The wavelengths λ1 and λ2 illustrated in FIG. 7 are wavelengths assigned to rays of probe light transmitted from the ITGs 119 and 129 to the FP 411, respectively. Differentiating wavelengths of rays of light for detection with respect to each direction in which the light is transmitted through a FP as described above is also performed in transmission line health monitoring by the OTDR.

The optical cable in FIG. 5 includes eight optical fibers in total. Among the optical fibers, only two optical fibers in the FP 414 are used as an optical fiber that has the sensing function and the optical communication function at the same time. As described in the first example embodiment, limiting the optical fibers that have the sensing function and the optical communication function at the same time to two optical fibers in the FP 414 enables a cost at the time of adding a component for a sensing signal to an optical amplification repeater device for communication to be kept to the minimum necessary.

On the other hand, it is assumed that, as illustrated in FIG. 8, an ITG 117 and the ITG 129 are connected to a FP 413 and the FP 414 in the optical cable 21, respectively (in FIG. 8, illustrations relating to a FP 411 and a FP 412 are omitted). In this case, the ITG 117 and the ITG 129 are not connected to one FP in an opposing manner. In such a case, there is no need to differentiate a wavelength λ1 assigned to probe light from the ITG 117 from a wavelength λ2 assigned to probe light from the ITG 129, and it is thus possible to eliminate the need for management of wavelength types of probe light.

Regarding a return light path in a repeater, in practice, it is suitable to achieve the configuration in FIG. 8 by preparing paths in both directions, as illustrated in FIG. 6, and shutting off a path in one direction by an optical switching function, which will be described later.

Transponder groups 116 and 127 in FIG. 8 are transponder groups that are connected to both ends of the FP 413. The transponder groups 118 and 128 are transponder groups that are connected to both ends of the FP 414.

A coupler 133a is a device for multiplexing a communication optical signal from the transponder group 116 and probe light from the ITG 117 with each other and transmitting the multiplexed light to an optical fiber 4131. A coupler 133b is a device for splitting and inputting light from an optical fiber 4132 to the transponder group 116 and the ITG 117.

The wavelength selection coupler 134a is a device for transmitting a communication optical signal from the transponder group 118 to the optical fiber 4141. The wavelength selection coupler 134b is a device for inputting light from the optical fiber 4142 to the transponder group 118.

A configuration of a cable system 10 that is another configuration of the second example embodiment is illustrated in FIG. 9. As described in Background Art, as a form of a path for return light in an optical amplification repeater device installed in a communication path constituted by a FP, two forms, namely, as illustrated in FIGS. 1A and 1B, a form in which return light is multiplexed with light on the output side of an opposite amplifier (see FIG. 1A) and a form in which return light is multiplexed with light on the input side of an opposite amplifier (see FIG. 1B), have been known. The afore-described configuration in FIG. 6 is a form in which backscattered light is multiplexed with light on the input side as illustrated in FIG. 1B. In contrast, FIG. 9 illustrates a form in which the cable system of the second example embodiment is configured in such a manner that backscattered light is multiplexed with light on the output side as illustrated in FIG. 1A.

Probe light of a wavelength $\lambda 1$ and probe light of a wavelength $\lambda 2$ are wavelength-division-multiplexed with communication optical signals, which are wavelength division multiplexed main signals, and transmitted through the optical fiber 4141 and the optical fiber 4142 collaterally with the communication optical signals, respectively.

A portion of backscattered light of the wavelength $\lambda 1$ generated in the optical fiber 4141 within the optical fiber section 1 is separated by a coupler 3m11 of an optical amplification unit 314 and amplified by an optical amplifier 3m5, and, subsequently, bandwidth of the separated backscattered light is restricted to only a sensing wavelength band by a filter 3m7. Subsequently, the backscattered light is multiplexed with light transmitted through the optical fiber 4142 by a coupler 3m9 and transmitted through the optical fiber 4142 collaterally with a communication optical signal.

Likewise, a portion of backscattered light of the wavelength $\lambda 2$ generated in the optical fiber 4142 within the optical fiber section 2 is separated by the coupler 3m9 and amplified by an optical amplifier 3m4, and, subsequently, bandwidth of the separated backscattered light is restricted to the sensing wavelength band by a filter 3m6. The backscattered light of the wavelength $\lambda 2$ is further multiplexed with light flowing in the optical fiber 4141 by the coupler 3m11 and transmitted through the optical fiber 4141 toward the ITG 129 collaterally with a communication optical signal.

The description of FIG. 9 is the same as that of FIG. 6 except the above-described configuration, and an overlapping description will be omitted.

Advantageous Effects

In the present example embodiment, as with the first example embodiment, a configuration that causes an optical transmission system including an optical amplification repeater device to also have a function of sensing a surrounding environment by use of an optical cable as a sensor is provided.

In the cable system of the present example embodiment, backscattered light of probe light, after having been amplified by an optical amplifier for backscattered light, is amplified by an optical amplifier for amplifying a communication optical signal and arrives at an ITG that is a transmission source of the probe light. Therefore, the cable system is capable of further preventing the ITG from becoming incapable of acquiring environmental information because of backscattered light being obscured by noise.

Since, when the present example embodiment is used, neither an optical fiber pair dedicated for sensing nor a pair of amplification units dedicated for the optical fiber pair need to be disposed, the cable system of the present example embodiment excels in economic efficiency. Further, since it is sufficient to apply the configuration of the present example embodiment to at least a pair of optical fibers within a cable, it is possible to prevent a cost to add the sensing function from increasing.

Third Example Embodiment

The present example embodiment is an example embodiment relating to a common technology to improve technological details of the first and second example embodiments. The present example embodiment relates to a technology that enables transmission of probe light for sensing and backscattered light generated from the probe light to be remotely shut off.

[Configuration and Operation]

Figure 10:
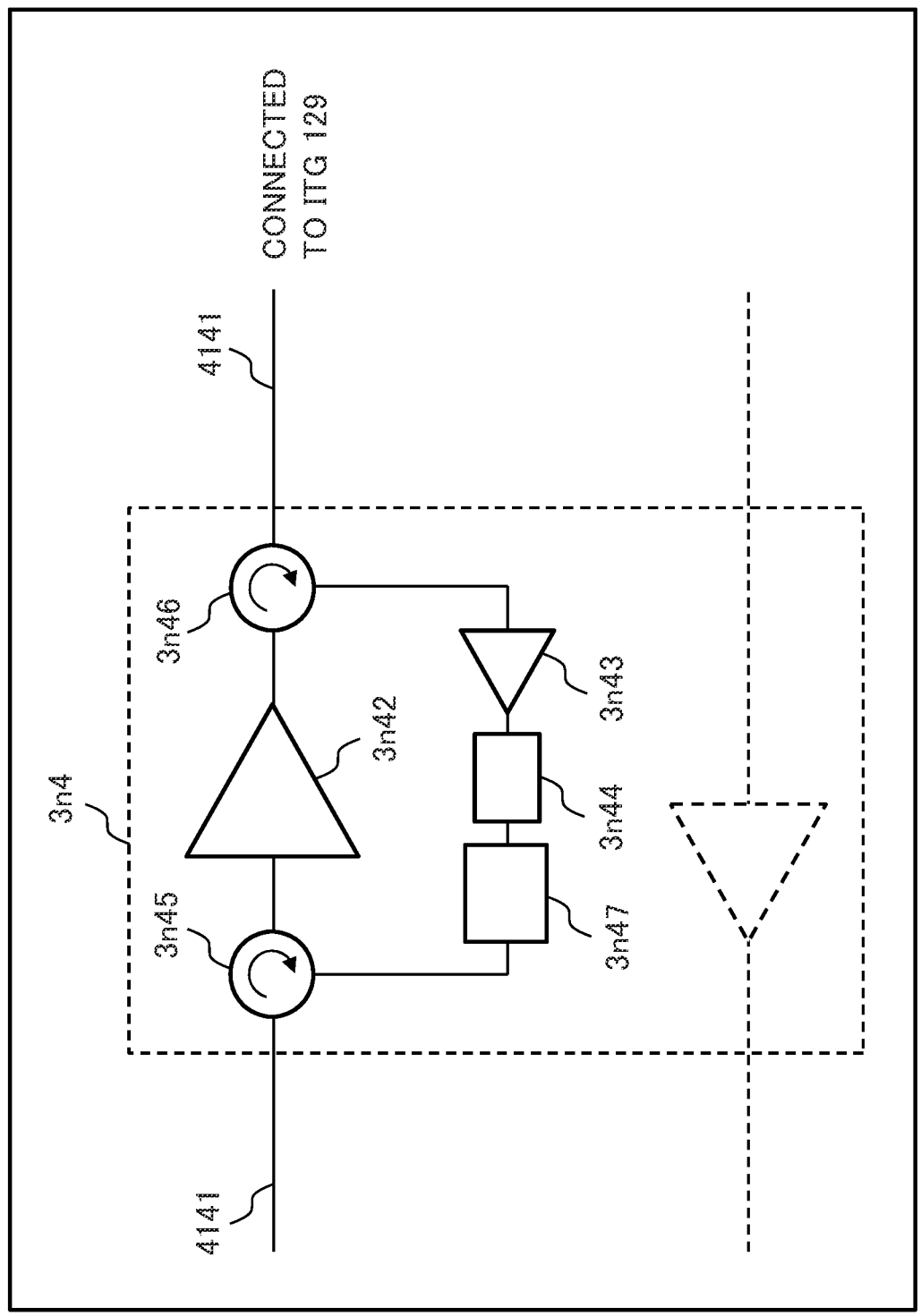
FIG. 10 is a conceptual diagram illustrating a first configuration example of an optical amplification repeater device of a third example embodiment.

FIG. 10 is a conceptual diagram illustrating a configuration of an optical amplification unit 3n4, which is a first configuration example when the present example embodiment is applied to the first example embodiment. The optical amplification unit 3n4 illustrated in FIG. 10 is an optical amplification unit that is achieved by adding a switch 3n47, which is an optical switch, to the optical amplification unit 3n4 of the first example embodiment illustrated in FIG. 4.

The switch 3n47 is configured to be able to be remotely controlled to turn on and off. This configuration enables the optical amplification unit 3n4 to stop transmission of probe light to a portion of an optical fiber 4141 on the left side of the optical amplification unit 3n4.

A control signal to cause the switch 3n47 to turn on and off is, for example, transmitted from a not-illustrated terminal station device to the switch 3n47 through any one of optical fibers included in an optical cable. A method for communicating the control signal is disclosed in, for example, NPL 1.

When a configuration equivalent to the configuration of the optical amplification unit 3n4 illustrated in FIG. 10 is applied to optical amplification units 314 to 3(n–1)4 illustrated in FIG. 2, an optical amplification unit to which the configuration is applied is capable of stopping propagation of probe light to a portion of a FP 414 beyond the optical amplification unit.

Figure 11:
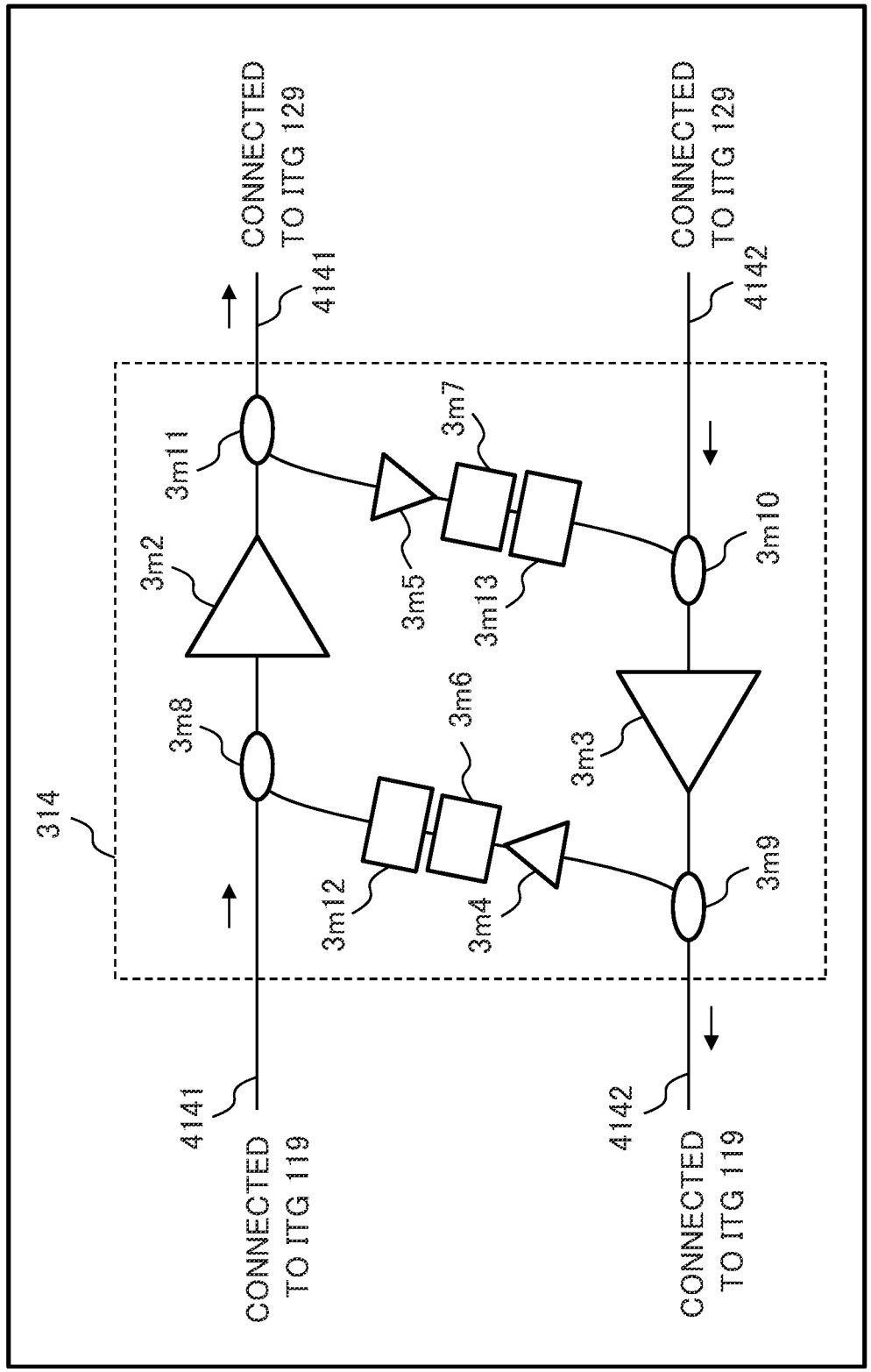
FIG. 11 is a conceptual diagram illustrating a second configuration example of the optical amplification repeater device of the third example embodiment.

FIG. 11 is a conceptual diagram illustrating a configuration of an optical amplification unit 314, which is a second configuration example when the present example embodiment is applied to the second example embodiment. The optical amplification unit 314 illustrated in FIG. 11 is an optical amplification unit that is achieved by adding switches 3m12 and 3m13, which are optical switches, to the optical amplification unit 314 of the second example embodiment illustrated in FIG. 6.

The switches 3*m*12 and 3*m*13 are configured to be able to be remotely controlled to turn on and off. When the switch 3*m*12 is turned off, the optical amplification unit 314 is capable of stopping backscattered light from the left side through an optical fiber 4142 from being transmitted to the ITG 129. When the switch 3*m*13 is turned off, the optical amplification unit 314 is capable of stopping backscattered light transmitted from the right side through the optical fiber 4141 from being transmitted to the left side (to the ITG 119) through the optical fiber 4142.

A control signal to cause the switches 3*m*12 and 3*m*13 to turn on and off is, for example, transmitted from a not-illustrated terminal station device to the switches 3*m*12 and 3*m*13 through any one of the optical fibers included in the optical cable. A method for communicating the control signal is disclosed in, for example, NPL 1.

Figure 12:
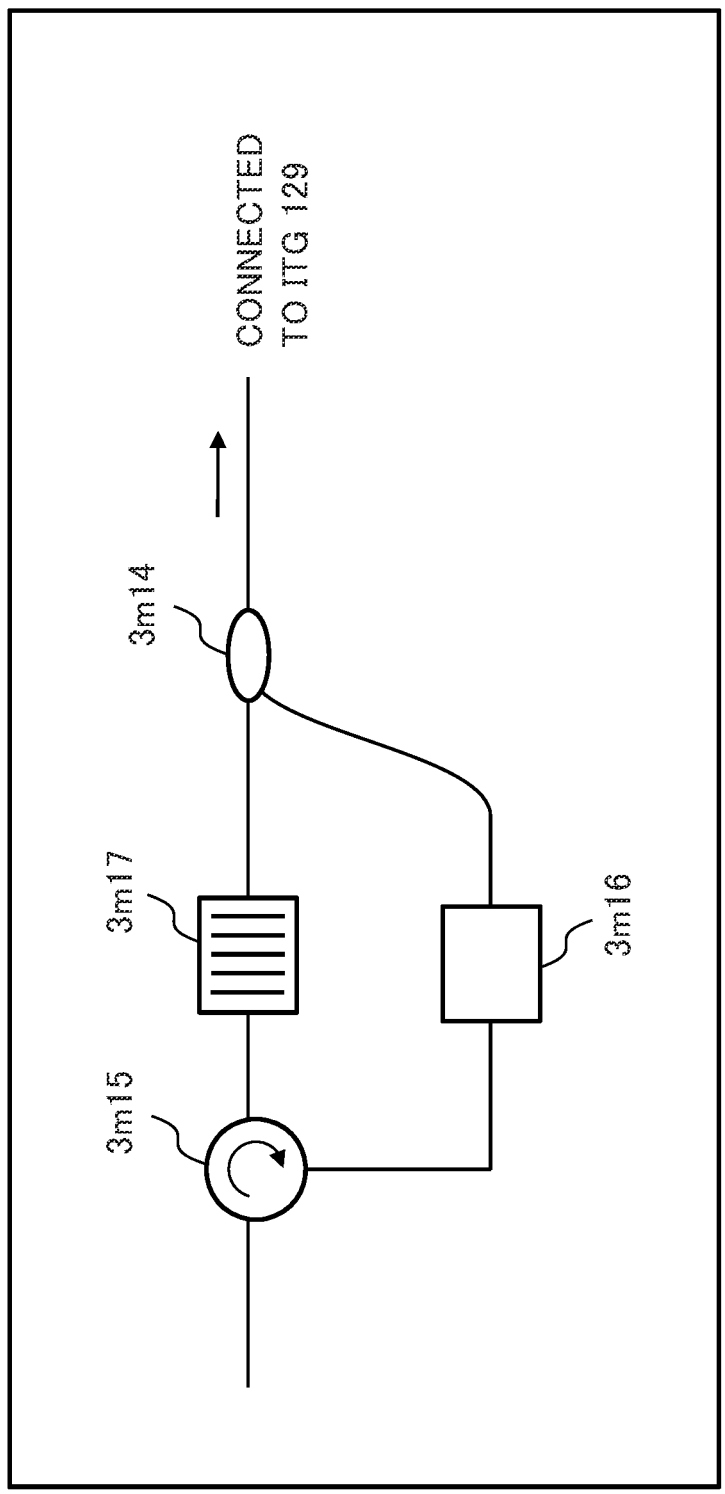
FIG. 12 is a conceptual diagram illustrating a third configuration example of the optical amplification repeater device of the third example embodiment.

The optical amplification unit 314 illustrated in FIG. 11 is incapable of stopping transmission of probe light. A configuration, an example of which is illustrated in FIG. 12, may be incorporated in an optical amplification repeater device as a method for switching between passage and blocking of any wavelength signal at any site in the cable system. A FBG 3*m*17 is an optical filter that reflects light in a wavelength band of probe light. As used herein, "FBG" is an abbreviation for "fiber Bragg grating".

In the configuration illustrated in FIG. 12, probe light from the left side is input to the FBG 3*m*17 by a circulator 3*m*15 and reflected in the leftward direction. The reflected probe light is input to a switch 3*m*16, which is an optical switch, by the circulator 3*m*15.

When the switch 3*m*16 is in the on state, the probe light is multiplexed with light that has passed the FBG 3*m*17 by a coupler 3*m*14 and transmitted in the rightward direction. On the other hand, when the switch 3*m*16 is in the off state, the probe light is shut off.

Therefore, the configuration in FIG. 12 enables passage and shut-off of probe light from the left side of the configuration to be remotely controlled.

A method other than the method using an optical switch is conceivable as a method for shutting off light, which is used in the third example embodiment. For example, a method of suspending excitation of an optical amplifier that amplifies probe light or backscattered light the passage and shut-off of which are to be switched may be applicable. Specifically, when the optical amplifier is of an optical excitation type, such as an EDFA, a method of suspending excitation light of the optical amplifier is conceivable, and, when the optical amplifier is of a current excitation type, such as a SOA, a method of suspending current is conceivable. When excitation is suspended, an optical amplification medium absorbs probe light or backscattered light. The absorption loss enables probe light or backscattered light to be shut off.

The function provided by the present example embodiment is to enable a range of distance within which optical fiber sensing is performed to be remotely set. Being capable of setting a range of the distance is important from the following point of view.

In a cable system that is configured using optical amplification repeater devices of a single type, probe light emitted from an ITG is transmitted to a terminal station on the opposite side without being shut off. While the probe light is kept transmitted in the cable system, backscattered light is kept generated and keeps returning to the ITG. While backscattered light keeps arriving at the ITG, probe light having the same wavelength and polarization as those of the preceding probe light cannot be transmitted again. Therefore, in this case, there is a high possibility that a sampling rate in the ITG is limited to a substantially low value. In addition, even in the case of measurement in a long distance to the extent that sensing precision cannot be ensured anymore due to an SN ratio, a nonlinear phenomenon in the optical fiber, or the like, the measurement cannot be terminated at an intermediate point. Therefore, in order to transmit probe light having the same wavelength and polarization again, the ITG is required to wait until preceding probe light reaches a far end and backscattered light thereof ceases to return.

The configuration illustrated in FIG. 10 is capable of stopping propagation of probe light itself. On the other hand, the configuration in FIG. 11, although incapable of stopping propagation of probe light, is capable of at least preventing backscattered light from reaching the ITG. Because of this capability, both configurations are capable of remotely setting a range of sensing distance.

A method of, in manufacture of optical amplification repeater devices, preparing a type of optical amplification repeater device that has a path for transmitting probe light in a FP and a type of optical amplification repeater device that does not have such a path and installing one of the two types of optical amplification repeater devices at a place requiring the type is also conceivable. However, in this case, a problem in that the number of types of optical amplification repeater devices to be prepared increases may occur. Therefore, a management cost to prevent an error in selection of an appropriate type of optical amplification repeater device increases and the number of types of optical amplification repeater devices to be kept as spares increases, which causes a cost to increase. When the types of optical amplification repeater devices are unified to a type of optical amplification repeater device having a probe light path, the management cost is reduced and overall cost reduction can also be achieved. However, in order to unify the types of optical amplification repeater devices, a function enabling a path for probe light or backscattered light to be remotely switched on and off needs to be provided to a unified type of optical amplification repeater device. For such a case, the configurations illustrated in FIGS. 10 and 11 are effective.

Advantageous Effects

An optical amplification unit of the present example embodiment is capable of stopping passage of probe light or backscattered light of probe light through an optical amplification repeater device by remote operation from the outside. Therefore, the optical amplification unit produces an advantageous effect that a problem in that, while backscattered light keeps arriving at an ITG, the ITG cannot transmit probe light and a sampling rate in the ITG is limited to a substantially low value can be eliminated, and the like.

Fourth Example Embodiment

Use of the technologies of the example embodiments described thus far enables long-distance optical fiber sensing because light related to optical fiber sensing is also amplified and transmitted by an optical amplification repeater device. The present example embodiment relates to a technology for, in a cable system that is enabled to perform long-distance optical fiber sensing by use of an optical amplifier in such a manner, further advancing the value of the cable system.

[Configuration and Operation]

Figure 13A:
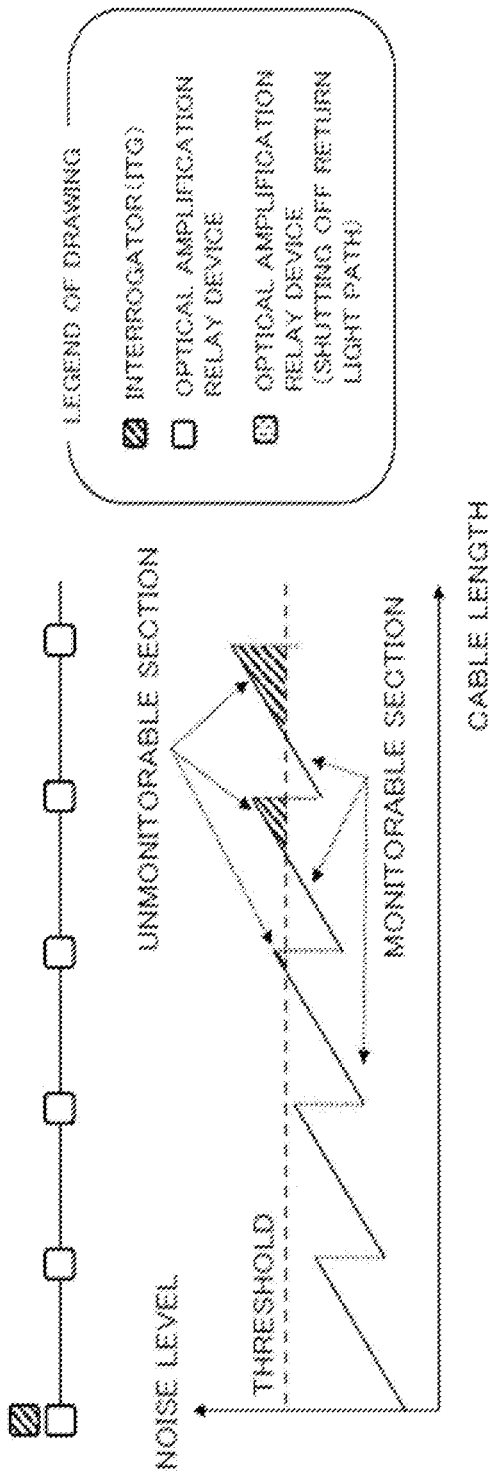
FIGS. 13A and 13B are explanatory diagrams for a description of a technology of a fourth example embodiment.
Figure 13B:
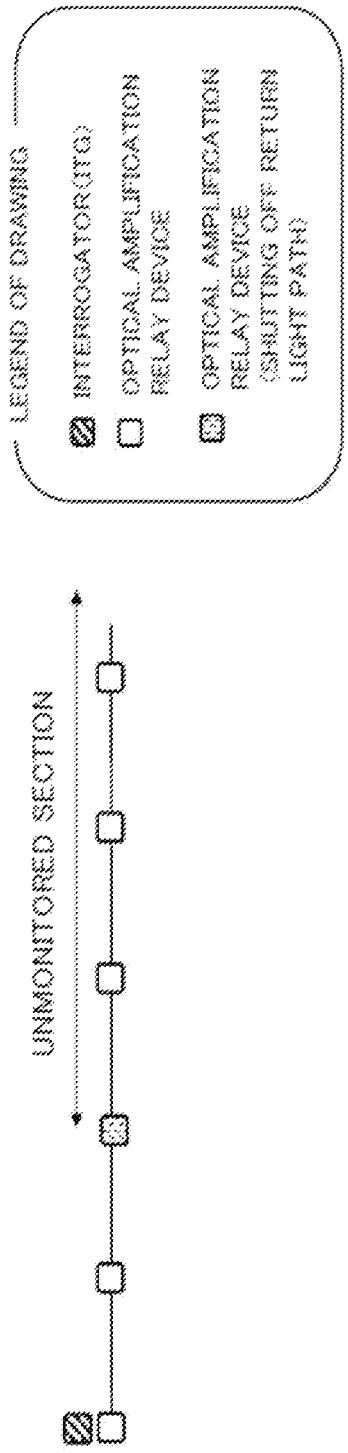

FIG. 13A and FIG. 13B are explanatory diagrams for a description of a technology of the present example embodiment. In FIG. 13A and FIG. 13B, a level of noise included in a normalized signal when all signal levels that are detected by an ITG installed in a terminal station device are normalized in a cable system is illustrated. The cable system is a cable system that, by applying the technologies in the first and second example embodiments, compensates for attenuation of probe light and backscattered light (in the description of the present example embodiment, collectively referred to as sensing light) by optical amplification. Since attenuation of sensing light is compensated for by optical amplification repeating, a noise level in the sensing light is reduced when the sensing light passes an optical amplification repeater device. However, the level of noise does not recover to a level having been achieved at a transmission end in principle. Therefore, as the number of times of optical amplification repeating increases, that is, as the location goes away from an ITG, the noise level gradually increases. A repeater section in which the noise level exceeds a noise level threshold, below which the noise level is required to fall in order to gain sufficient sensing precision, appears.

A point in a repeater section at which the noise level is highest is a point immediately before a point at which probe light enters an optical amplification repeater device. This is because probe light becomes weakest at the point immediately before the point at which the probe light enters the optical amplification repeater device due to transmission loss and, since the point is a point farthest from an optical amplifier for backscattered light generated from the weakened probe light, the backscattered light also suffers the largest transmission loss. As a result, a phenomenon in which an optical SN ratio deteriorates due to accumulation of noise light escalates from the point.

However, even when such a phenomenon occurs, sensing light can be monitored at a point immediately after a point at which probe light exits an optical amplification repeater device within a repeater section because the noise level is low at the point.

Accordingly, in the present example embodiment, a section in which the noise level has increased and sensing light thus cannot be monitored is determined as an "unmonitorable section", and the cable system is configured not to output data obscured by noise. On the other hand, sensing data acquired from a monitorable section continue to be output.

As a specific embodiment of a feature of not outputting data in an "unmonitorable section", various well-known methods are applicable. Examples of such an applicable method include a method in which a special data value indicating that the data are data acquired in an "unmonitorable section" is defined in advance and output data of the section are filled up with the value. The examples also include a method in which a composite data format including an attribute value in addition to numerical data is defined for sensing data, and an attribute value indicating that the data are data acquired in an "unmonitorable section" is set in the data format. The examples further include a method in which, by defining data that record whether sensing data is valid or invalid against cable length separately from the sensing data and maintaining the data always in a pair with the sensing data, information about a position and a range of an "unmonitorable section" is maintained in an integrated manner with the sensing data.

The methods described above as examples have an advantage that, even when the range of the "unmonitorable section" increases or decreases, the amount of data that are output per unit time does not change. Outputting sensing data with attribute information added thereto, the attribute information indicating that the sensing data are invalid data, is practically the same as not outputting the sensing data because a recipient practically does not receive the sensing data.

Since the amount of data output per unit time increasing or decreasing depending on a condition or time is a burden to data processing and communication, it is often preferred that, by outputting data with an attribute indicating invalidity attached thereto even when the data are invalid data, the amount of data output per unit time do not change at a constant level.

As information used for determination of an "unmonitorable section", the noise level can be used. For example, since, when vibration at a site where a cable is placed is sensed, vibration that constantly appears although the cable is not subjected to vibration is a noise, not an actual vibration, an "unmonitorable section" can be discriminated.

For determination of an "unmonitorable section", a qualitative trend can also be used. Examples of the qualitative trend include a trend that a site in the vicinity of an input port of an optical amplification repeater device at which probe light is input is likely to be a starting point of an "unmonitorable section" and the "unmonitorable section" extends toward the upstream side along a route for the probe light as the location goes away from an ITG.

The above-described determination operation of an "unmonitorable section" is performed by, for example, a processing unit of a computer included in the ITG.

Advantageous Effects

As the location goes away from the ITG, a ratio of an "unmonitorable section" to one repeater section increases to a level that makes the monitoring meaningless at some repeater section. In that case, it is only required to shut off the sensing light by use of the method described in the third example embodiment.

When the technology of the present example embodiment is not used in that case, it is required to not only shut off the sensing light in sections beyond a section in which an "unmonitorable section" of any length appears but also discard data from a section that is still valid. This is because there is a high possibility that sensing data having no relation to actual environmental information appear from a section in which the noise level exceeds the threshold and an analysis system, a warning system, or the like based on the sensing data malfunctions.

Use of the technology of the present example embodiment enables information from a monitorable section that is still left valid to be utilized.

<Variations>

In the following description, some variations based on generally known technological knowledge will be described.

Although, as an optical device that separates an optical signal depending on a propagation direction thereof, a coupler (and an isolator) and a circulator were used in the first example embodiment and the second example embodiment, respectively, the devices may be exchanged. The circulator may be made to also serve as an isolator, which is required for input and output to and from an optical amplifier. In that case, an advantageous effect of reducing insertion loss of an optical component can be expected in addition to cost reduction.

In the example embodiments, a coupler (directional optical coupler) was used as an optical device for multiplexing optical signals having the same propagation direction. Although the description was made assuming that there is no wavelength dependence in multiplexing, a wavelength selection coupler may be used because optical signals to be multiplexed have different wavelength bands from each other.

As a method for achieving an optical filter, a dielectric multilayer film, a fiber Bragg grating (FBG), and the like have been known, and it has been known that, as a form of an optical filter, a transmission type, a reflection type, and the like exist. An optical filter the filter shape (a band pass center wavelength, a pass bandwidth, and the like) of which is variable has also been known. For embodiment of the technology of the example embodiments, any one of the above-described technologies may be applied.

As a method for achieving an optical amplifier for probe light or backscattered light provided inside an optical amplification repeater device, an optical fiber-type amplifier (EDFA) and a semiconductor optical amplifier (SOA), which were described in Background Art, a lumped Raman amplifier, and the like are applicable. Any one of the amplifiers may be used as long as the amplifier is a means for optical amplification.

A multiplexing/demultiplexing component that is included in an optical amplification repeater device and that was used in the technologies of the example embodiments may also serve as a multiplexing/demultiplexing component for transmission line health monitoring using the OTDR.

In the above description of the example embodiments, the description was made assuming that an application destination of the technologies of the example embodiment was an optical amplification repeater device inserted in a cable. Although the above description was aimed at avoiding complicated description, it is needless to say that the technologies of the example embodiments are, as with the transmission line health monitoring method using the OTDR, also applied to an optical amplification device that is connected to a cable in a terminal station.

The present disclosure was described above with reference to example embodiments thereof, but the present disclosure is not limited to the above-described example embodiments. Various modifications that could be understood by a person skilled in the art may be applied to the configurations and details of the present disclosure within the scope of the present disclosure.

For example, although the network configuration described above was a point-to-point link, the present invention can likewise be embodied in a more complicated network configuration including a branch.

In the above description, optical cables in the example embodiments may be submarine cables or optical cables laid on land. The optical cables may be laid at any place.

In the above description, the description was made assuming that cables in the example embodiments are optical fiber cables that have optical fibers as main constituent elements. However, the present technology can likewise be applied to a cable in which an optical fiber is included as a secondary constituent element in a power transmission cable having a copper wire as a main constituent element, and the same advantageous effects can be attained.

Figure 14:
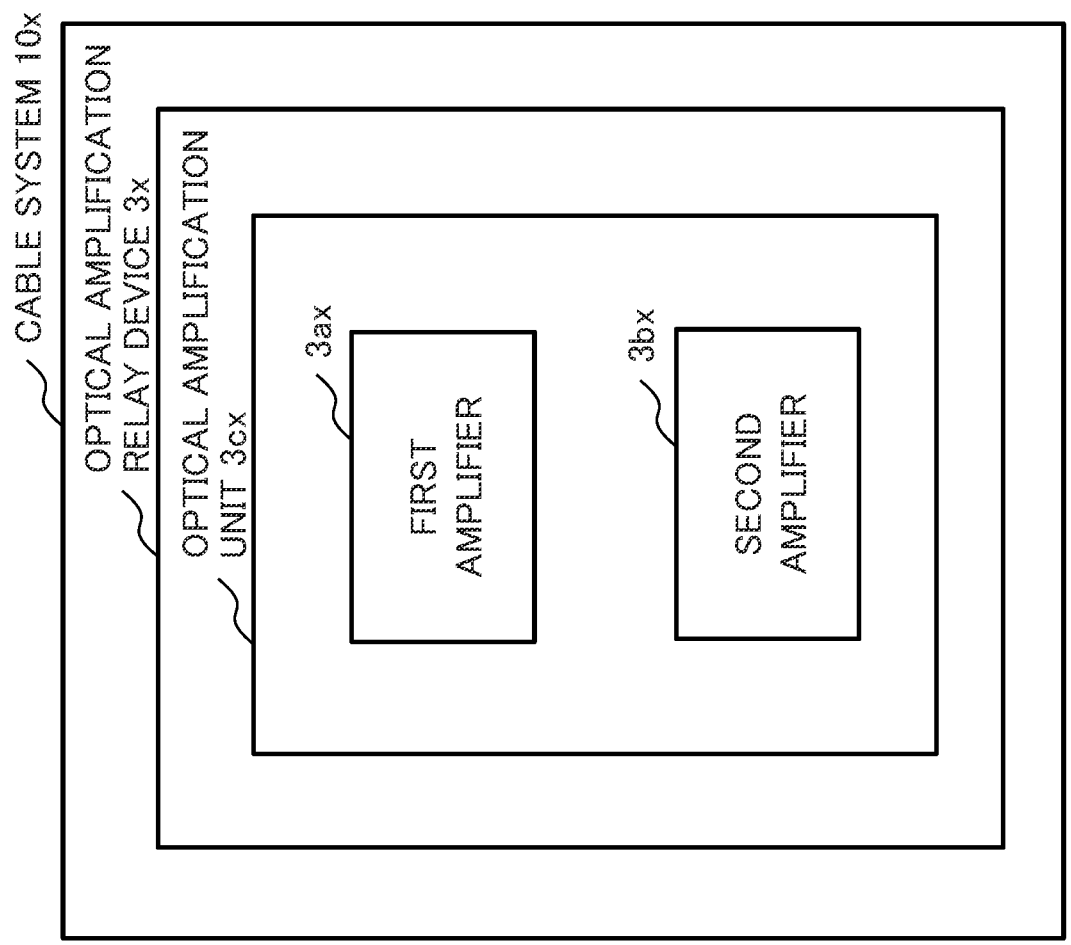
FIG. 14 is a conceptual diagram illustrating a minimum configuration of the optical amplification repeater devices of the example embodiments.

FIG. 14 is a block diagram illustrating a configuration of a cable system 10$x$ that has a minimum configuration of an amplification device of the example embodiments. The cable system 10$x$ includes an optical amplification repeater device 3$x$. The optical amplification repeater device 3$x$ includes an optical amplification unit 3$cx$. The optical amplification unit 3$cx$ includes a first amplifier 3$ax$ and a second amplifier 3$bx$.

The optical amplification repeater device 3$x$ is a cable system that uses a cable including a plurality of optical fibers for optical fiber sensing of an environment surrounding the cable. The optical amplification repeater device 3$x$ includes an optical amplification repeater device that compensates for transmission loss including loss in the optical fibers.

The optical fiber sensing is sensing in which probe light, which is transmitted light used for the optical fiber sensing, is transmitted through one of the optical fibers and backscattered light that is related to the probe light and arrives from the optical fiber is received and analyzed.

To at least one end of the cable, a transmission/reception device for sensing, which performs the optical fiber sensing, is connected. To the ends of the cable, transmission/reception devices for performing the optical fiber communication may be connected.

In the optical fiber having a function of the optical fiber sensing, a first wavelength band and a second wavelength band are configured in such a way as to be different from each other. In this configuration, the first wavelength band is a wavelength of an optical signal used for a use other than the sensing. The second wavelength band is a wavelength of the probe light and the backscattered light.

An optical amplification unit that is included in the optical amplification repeater device and performs amplification and repeatering for the optical fiber having the function of the optical fiber sensing includes a first amplifier and a second amplifier that amplify rays of light propagating in opposite directions to each other.

Each of the probe light and the backscattered light is amplified by at least one of the first amplifier and the second amplifier.

Therefore, the optical amplification repeater device 3$x$ is capable of amplifying and repeating both the probe light and the return light. Accordingly, the optical amplification repeater device 3$x$ enables optical amplification repeating in a cable system performing optical fiber sensing.

Therefore, the cable system 10$x$ enables extension of a sensing range through application of an optical amplification repeater device to an optical fiber sensing system. The cable system 10$x$ further provides a cable system in which an optical communication system that has achieved long-distance communication by use of an optical amplification repeater device and an optical fiber sensing system coexist.

Therefore, the cable system 10$x$ enables advantageous effects described in Advantageous Effects of Invention to be attained by the above-described configuration.

While the example embodiments of the present invention have been particularly shown and described, the present invention is not limited to these example embodiments described above, and further modification, replacement, and adjustment may be made therein without departing from the basic technical idea of the present invention. For example, the configuration of constituent components illustrated in the drawings is an example to help understanding of the present invention, and it is not intended that the configuration be limited to the configuration illustrated in the drawings.

All or part of the example embodiments described above may be described as in the following Supplementary Notes, but the present invention is not limited thereto.

(Supplementary Note 1)

A cable system using a cable including a plurality of optical fibers for optical fiber communication and optical fiber sensing of an environment surrounding the cable, the cable system including an optical amplification repeater device that compensates for loss in the optical fibers, wherein the optical fiber sensing is sensing in which probe light, which is transmitted light used for the optical fiber sensing, is transmitted through one of the optical fibers and backscattered light that is related to the probe light and arrives from the optical fiber is received and analyzed, to ends of the cable, transmission/reception devices for performing the optical fiber communication are connected, to at least one end of the cable, a transmission/reception device for sensing that performs the optical fiber sensing is connected, the optical fiber communication is bidirectional communication using an optical fiber pair, which is a pair of the optical fibers, and, in the optical fiber having both functions of the optical fiber communication and the optical fiber sensing, a first wavelength band that is a wavelength of a communication optical signal, which is an optical signal used for the optical fiber communication, and a second wavelength band that is a wavelength of the probe light and the backscattered light are configured in such a way as to be different from each other, an optical amplification unit included in the optical amplification repeater device, the optical amplification unit performing amplification and repeating of light transmitted through the optical fiber having both functions of the optical fiber communication and the optical fiber sensing, includes a first amplifier and a second amplifier that amplify rays of light propagating in opposite directions to each other, and each of the communication optical signal, the probe light, and the backscattered light is amplified by at least one of the first amplifier and the second amplifier.

(Supplementary Note 2)

The cable system according to Supplementary Note 1, wherein the number of the optical fibers used for the optical fiber sensing is smaller than the number of all the optical fibers included in the cable and the number of optical amplification units connected to the optical fibers used for the optical fiber sensing is smaller than the number of all optical amplification units included in the optical amplification repeater device.

(Supplementary Note 3)

The cable system according to Supplementary Note 1 or 2, wherein, in the optical fiber having both functions of the optical fiber communication and the optical fiber sensing, the probe light and the backscattered light are subjected to single-core bidirectional transmission through the single optical fiber and are subjected to amplification repeat transmission by use of an optical amplification repeater device having a single-core bidirectional configuration, and the probe light is transmitted in an opposite direction to a direction of the communication optical signal.

(Supplementary Note 4)

The cable system according to Supplementary Note 3 further including a transmission blocking unit that performs blocking of transmission of the probe light or the backscattered light by remote operation.

(Supplementary Note 5)

The cable system according to Supplementary Note 4, wherein the blocking is performed by suspending excitation of an optical amplifier that amplifies the optical signal for sensing or the backscattered light.

(Supplementary Note 6)

The cable system according to Supplementary Note 3, wherein an optical amplifier to which the transmission/reception device for sensing is directly connected and that a constituent element for performing optical communication includes is an optical amplifier of a single-core bidirectional type for the probe light.

(Supplementary Note 7)

The cable system according to Supplementary Note 1, wherein, in the optical fiber having both functions of the optical fiber sensing and the optical fiber sensing, the probe light and the backscattered light related to the probe light are configured to be respectively co-propagate with the communication optical signal, the cable system including, in the optical amplification repeater device that amplifies light transmitted through the optical fiber pair, a light path that causes the backscattered light to be multiplexed with light transmitted through the other optical fiber of the optical fiber pair, wherein the light path includes an optical amplifier and an optical filter that select a wavelength band of the backscattered light that is allowed to pass the light path and amplify the backscattered light.

(Supplementary Note 8)

The cable system according to Supplementary Note 7, wherein, to an optical amplifier to which the transmission/reception device for sensing is directly connected and that a constituent element for performing optical communication includes, the light path is disposed.

(Supplementary Note 9)

The cable system according to Supplementary Note 7 or 8 further including a transmission blocking unit that performs blocking of transmission of the probe light or the backscattered light by remote operation.

(Supplementary Note 10)

The cable system according to Supplementary Note 9, wherein the blocking is performed by suspending excitation of the optical amplifier that amplifies the probe light or the backscattered light.

(Supplementary Note 11)

The cable system according to any one of Supplementary Notes 7 to 10, wherein to the optical fiber pair among the plurality of the optical fiber pairs, the transmission/reception devices for sensing that include transmission units that transmit rays of the probe light having wavelengths different from each other and reception units that receive rays of the backscattered light related to the rays of the probe light are connected.

(Supplementary Note 12)

The cable system according to any one of Supplementary Notes 7 to 10, wherein to the optical fiber pairs that are included in the plurality of the optical fiber pairs and are different from each other, the transmission/reception devices for sensing that include transmission units that transmit rays of the probe light having the same wavelength and reception units that receive rays of the backscattered light related to the rays of the probe light are connected.

(Supplementary Note 13)

The cable system according to any one of Supplementary Notes 1 to 12 further including
the transmission/reception device for sensing including a processing unit,
wherein the processing unit performs the analysis as well as determination of whether data having been subjected to the analysis is valid data or invalid data as data representing surrounding environmental information of the cable and adds predetermined attribute information to the data that are determined to be the invalid data or does not output the data that are determined to be the invalid data.

(Supplementary Note 14)

The cable system according to Supplementary Note 13, wherein
the processing unit performs the determination, based on any one of a signal level, a noise level, and a signal to noise ratio of the received backscattered light.

(Supplementary Note 15)

An optical amplification repeater device, the optical amplification repeater device being a repeater device that, in a cable system that uses a cable including a plurality of optical fibers for optical fiber communication and optical fiber sensing of an environment surrounding the cable, amplifies and repeats loss in the optical fibers by optical amplifiers,
wherein the optical fiber sensing is sensing in which probe light, which is transmitted light used for the optical fiber sensing, is transmitted through one of the optical fibers and backscattered light that is related to the probe light and arrives from the optical fibers is analyzed, and
a first wavelength band that is a wavelength of a communication optical signal, which is an optical signal used for the optical fiber communication, and a second wavelength band that is a wavelength of the probe light and the backscattered light are different from each other,
the optical amplification repeater device including a first amplification unit and a second amplification unit,
wherein each of the communication optical signal, the probe light, and the backscattered light is amplified by at least one of the first amplifier and the second amplifier.

(Supplementary Note 16)

The optical amplification repeater device according to Supplementary Note 15, wherein an amplifier for one of the plurality of the optical fibers in the cable is a single-core bidirectional optical amplifier.

(Supplementary Note 17)

The optical amplification repeater device according to Supplementary Note 16 further including a transmission blocking unit that performs blocking of transmission of the probe light or the backscattered light by remote operation.

(Supplementary Note 18)

The optical amplification repeater device according to Supplementary Note 17, wherein the blocking is performed by suspending excitation of the optical amplifier that amplifies the probe light.

(Supplementary Note 19)

The optical amplification repeater device according to Supplementary Note 16 further including a switching unit that performs switching between passage and shut-off of the probe light by remote operation.

(Supplementary Note 20)

The optical amplification repeater device according to Supplementary Note 19, wherein the switching between the passage and the shut-off is performed by whether the optical amplifier that amplifies the probe light is excited.

(Supplementary Note 21)

The optical amplification repeater device according to Supplementary Note 15, wherein
the cable system is a cable system that includes one or more optical fiber pairs through each of which rays of light are transmitted in opposite directions by use of the two optical fibers as a pair,
the optical amplification repeater device including a light path that causes the backscattered light related to the probe light to be multiplexed with light transmitted through the other optical fiber of the pair of optical fiber,
wherein the light path includes an optical amplifier and an optical filter that select a wavelength band of the backscattered light that is allowed to pass the light path and amplify the backscattered light.

(Supplementary Note 22)

The optical amplification repeater device according to Supplementary Note 21 further including a transmission blocking unit that performs blocking of transmission of the probe light or the backscattered light by remote operation.

(Supplementary Note 23)

The optical amplification repeater device according to Supplementary Note 22, wherein the blocking is performed by suspending excitation of the optical amplifier that amplifies the probe light.

(Supplementary Note 24)

The cable system according to Supplementary Note 7 further including a switching unit that performs switching between passage and shut-off of the backscattered light by remote operation.

(Supplementary Note 25)

The cable system according to Supplementary Note 24, wherein the switching between the passage and the shut-off is performed by whether the optical amplifier that amplifies the backscattered light is excited.

(Supplementary Note 26)

The cable system according to any one of Supplementary Notes 1 to 14 further including
the cable,
wherein, between a terminal station device that performs the analysis and the first optical amplification repeater device after the terminal station device or inside the terminal station device, an optical multiplexing path for multiplexing first light in one optical fiber of an optical fiber pair composed of the optical fibers with second light in the other optical fiber of the optical fiber pair is disposed.

(Supplementary Note 27)

The cable system according to any one of Supplementary Notes 1 to 14 further including
the cable,
wherein, in the cable including the plurality of the optical fibers, the number of the optical fibers in which the probe light and the backscattered light related to the probe light are subjected to amplification repeat transmission is less than the number of optical fibers included in the cable.

(Supplementary Note 28)

The cable system according to any one of Supplementary Notes 1 to 14 further including the cable, wherein the cable includes a plurality of optical fiber pairs each of which is composed of the optical fibers, and, to ends of the cable, transmission/reception devices for sensing that include transmission units that transmit rays of the probe light having wavelengths different from each other and reception units that receive rays of the backscattered light related to the rays of the probe light are connected.

(Supplementary Note 29)

The cable system according to Supplementary Note 28 further including the transmission/reception device for sensing.

(Supplementary Note 30)

The cable system according to any one of Supplementary Notes 2 to 6 further including the cable, wherein the cable system transmits the communication optical signal and the probe light through the single optical fiber in opposite directions to each other.

(Supplementary Note 31)

The cable system according to any one of Supplementary Notes 7 to 11 further including the cable, wherein the cable includes a plurality of the optical fiber pairs and, to a plurality of ends of the cable, transmission/reception devices for sensing that include transmission units that transmit rays of the probe light having the same wavelength and reception units that receive rays of the backscattered light related to the rays of the probe light are connected, and the optical fiber pairs to an end of each of which the transmission/reception device for sensing is connected are differentiated from each other.

(Supplementary Note 32)

The cable system according to Supplementary Note 31 further including the transmission/reception device for sensing.

(Supplementary Note 33)

The cable system according to any one of Supplementary Notes 26 to 32 further including a processing unit that performs the analysis as well as identification of a section of the cable in which the analysis is difficult to perform.

(Supplementary Note 34)

The cable system according to Supplementary Note 33, wherein the processing unit performs the identification, based on at least any one of a signal level, a noise level, and a signal to noise ratio of the backscattered light and whether a sensing location is in a vicinity of the optical amplification repeater device.

(Supplementary Note 35)

The cable system according to any one of Supplementary Note 33 or 34, wherein the processing unit does not perform the analysis with respect to a section of the cable in which the analysis is difficult to perform.

(Supplementary Note 36)

The cable system according to any one of Supplementary Notes 33 to 35, wherein the processing unit applies an analysis result of another section in which the analysis of the cable was able to be performed to the identified section.

The optical fibers in Supplementary Note 1 are, for example, the optical fiber 4141 in FIG. 4 or the optical fibers 4141 and 4142 in FIG. 6. The optical fibers are alternatively, for example, the optical fibers 4131, 4132, 4141, and 4142 in FIG. 8, the optical fiber 4141 in FIG. 10, or the optical fibers 4141 and 4142 in FIG. 11.

The cable is, for example, the optical cable 21 in FIG. 2 or 5. The cable system is, for example, the cable system 10 in FIG. 2 or 5.

The optical amplification repeater device is, for example, the optical amplification repeater device 31, 32, 3($n$–1), or 3$n$ illustrated in FIG. 2 or 5. The optical amplification unit is the optical amplification unit 314, 324, 3($n$–1)4, or 3$n$4 illustrated in FIG. 2 or the optical amplification repeater device 3($n$–1)4 or 3$n$4 illustrated in FIG. 4.

The optical amplification repeater device in Supplementary Notes 17, 19, and 20 is, for example, the optical amplification unit 3$n$4 illustrated in FIG. 10. The optical amplification device in Supplementary Note 18 is an optical amplification device including the afore-described configuration that suspends excitation of the optical amplifier.

The optical amplification repeater device in Supplementary Note 21 is, for example, the optical amplification unit 314 illustrated in FIG. 6 or 9. The optical amplification repeater device in Supplementary Note 22 is, for example, the optical amplification unit 314 illustrated in FIG. 11.

The probe light is, for example, the afore-described probe light or probe pulsed light. The backscattered light is, for example, the afore-described Rayleigh backscattered light or backscattered light.

The analysis is, for example, analysis of the received backscattered light that is performed by the ITG 119 or 129 in FIG. 2, 4, 5, 6, 8, or 9. The transmission/reception device is, for example, the transponder group 111 or 121 in FIG. 2, 4, 5, 6, 8, or 9, the transponder group 118 or 128 in FIG. 6 or 9, the transponder group 116, 118, 127, or 128 in FIG. 8, or a transponder included in the transponder groups.

The transmission/reception device for sensing is, for example, the ITG 119 or 129 in FIG. 2, 4, 5, 6, 8, or 9. The optical fiber pair is, for example, the fiber pair 411, 412, 413, or 414 in FIG. 2, 5, 6, 8, or 9. The first wavelength band is, for example, a wavelength band of the wavelength division multiplexed main signal (communication optical signal) illustrated in FIG. 3 or 7.

The second wavelength band is, for example, a wavelength band of the probe light illustrated in FIG. 3 or 7.

The first amplifier is, for example, one of the optical amplifiers 3$n$42 and 3$n$43 illustrated in FIG. 4. The first amplifier is alternatively, for example, one of the optical amplifiers 3$m$2 and 3$m$5 illustrated in FIG. 6. The first amplifier is still alternatively, for example, one of the optical amplifiers 3$m$3 and 3$m$4 illustrated in FIG. 6. The first amplifier is still alternatively, for example, one of the optical amplifiers 3$m$21 and 3$m$5 illustrated in FIG. 8. The first amplifier is still alternatively, for example, one of the optical amplifiers 3$m$32 and 3$m$4 illustrated in FIG. 8. The first amplifier is still alternatively, for example, one of the optical amplifiers 3$m$3 and 3$m$4 illustrated in FIG. 11.

The second amplifier is, for example, one of the optical amplifiers 3$n$42 and 3$n$43 illustrated in FIG. 4 that is not the first amplifier. The second amplifier is alternatively, for example, one of the optical amplifiers 3$m$2 and 3$m$5 illustrated in FIG. 6 that is not the first amplifier. The second amplifier is still alternatively, for example, one of the optical amplifiers 3$m$3 and 3$m$4 illustrated in FIG. 6 that is not the first amplifier. The second amplifier is still alternatively, for example, one of the optical amplifiers 3$m$21 and 3$m$5 illustrated in FIG. 8 that is not the first amplifier. The second amplifier is still alternatively, for example, one of the optical amplifiers 3$m$32 and 3$m$4 illustrated in FIG. 8 that is not the first amplifier. The second amplifier is still alternatively, for example, one of the optical amplifiers 3*m*3 and 3*m*4 illustrated in FIG. 11 that is not the first amplifier.

The cable system in Supplementary Note 2 is, for example, the cable system 10 in FIG. 2 or 5.

The cable system in Supplementary Note 3 is, for example, the cable system 10 in FIG. 2, the cable system that includes the portion 901 in FIG. 4, or the cable system that includes the configuration in FIG. 10.

The cable system in Supplementary Note 4 is, for example, the cable system that includes the configuration in FIG. 10.

The cable system in Supplementary Note 5 is, for example, the cable system that includes the afore-described configuration that suspends excitation of the optical amplifier.

The cable system in Supplementary Note 6 is, for example, the cable system 10 in FIG. 2, the cable system that includes the portion 901 in FIG. 4, or the cable system that includes the configuration in FIG. 10. The cable system in Supplementary Note 7 is, for example, the cable system 10 in FIG. 5 or the cable system that includes the portion 902 in FIG. 6.

The cable system in Supplementary Note 8 is, for example, the cable system that includes the portion 902 in FIG. 6.

The cable system in Supplementary Note 9 is, for example, the cable system that includes the configuration in FIG. 11.

The cable system in Supplementary Note 10 is, for example, the cable system that includes the afore-described configuration that suspends excitation of the optical amplifier.

The cable system in Supplementary Note 11 is, for example, the cable system 10 in FIG. 5 or the cable system that includes the portion 902 in FIG. 6.

The cable system in Supplementary Note 12 is, for example, the cable system that includes the portion 902 in FIG. 8.

The cable system in Supplementary Notes 13 and 14 is, for example, the cable system 10 that includes an ITG that performs the operation described in the fourth example embodiment.

The optical fibers in Supplementary Note 15 are, for example, the optical fiber 4141 in FIG. 4 or the optical fibers 4141 and 4142 in FIG. 6. The optical fibers are alternatively, for example, the optical fibers 4131, 4132, 4141, and 4142 in FIG. 8, the optical fiber 4141 in FIG. 10, or the optical fibers 4141 and 4142 in FIG. 11.

The cable is, for example, the optical cable 21 in FIG. 2 or 5. The cable system is, for example, the cable system 10 in FIG. 2 or 5. The probe light is, for example, the afore-described probe light or probe pulsed light.

The backscattered light is, for example, the afore-described Rayleigh backscattered return light or backscattered light. The communication optical signal is, for example, the afore-described communication optical signal. The first wavelength band is, for example, a wavelength band of the wavelength division multiplexed main signal (communication optical signal) illustrated in FIG. 3 or 7. The second wavelength band is, for example, a wavelength band of the probe light illustrated in FIG. 3 or 7.

The first amplifier is, for example, one of the optical amplifiers 3*n*42 and 3*n*43 illustrated in FIG. 4. The first amplifier is alternatively, for example, one of the optical amplifiers 3*m*2 and 3*m*5 illustrated in FIG. 6. The first amplifier is still alternatively, for example, one of the optical amplifiers 3*m*3 and 3*m*4 illustrated in FIG. 6. The first amplifier is still alternatively, for example, one of the optical amplifiers 3*m*21 and 3*m*5 illustrated in FIG. 8. The first amplifier is still alternatively, for example, one of the optical amplifiers 3*m*32 and 3*m*4 illustrated in FIG. 8. The first amplifier is still alternatively, for example, one of the optical amplifiers 3*m*3 and 3*m*4 illustrated in FIG. 11.

The second amplifier is, for example, one of the optical amplifiers 3*n*42 and 3*n*43 illustrated in FIG. 4 that is not the first amplifier. The second amplifier is alternatively, for example, one of the optical amplifiers 3*m*2 and 3*m*5 illustrated in FIG. 6 that is not the first amplifier. The second amplifier is still alternatively, for example, one of the optical amplifiers 3*m*3 and 3*m*4 illustrated in FIG. 6 that is not the first amplifier. The second amplifier is still alternatively, for example, one of the optical amplifiers 3*m*21 and 3*m*5 illustrated in FIG. 8 that is not the first amplifier. The second amplifier is still alternatively, for example, one of the optical amplifiers 3*m*32 and 3*m*4 illustrated in FIG. 8 that is not the first amplifier. The second amplifier is still alternatively, for example, one of the optical amplifiers 3*m*3 and 3*m*4 illustrated in FIG. 11 that is not the first amplifier.

The optical amplification repeater device in Supplementary Note 16 is, for example, the optical amplification unit 314, 324, 3(*n*−1)4, or 3*n*4 illustrated in FIG. 2 or the optical amplification repeater device 3(*n*−1)4 or 3*n*4 illustrated in FIG. 4. The optical amplification repeater device in Supplementary Notes 17, 19, and 20 is, for example, the optical amplification unit 3*n*4 illustrated in FIG. 10. The optical amplification device in Supplementary Note 18 is an optical amplification device including the afore-described configuration that suspends excitation of the optical amplifier.

The optical amplification repeater device in Supplementary Note 21 is, for example, the optical amplification unit 314 illustrated in FIG. 6 or 9.

The optical amplification repeater device in Supplementary Note 23 is an optical amplification repeater device including the afore-described configuration that suspends excitation of the optical amplifier.

The cable system in Supplementary Notes 24 and 25 is, for example, the cable system that includes the afore-described configuration that switches between passage and shut-off of backscattered light.

The cable system in Supplementary Note 26 is, for example, the cable system that includes the configuration illustrated in FIG. 4 or 6.

The cable system in Supplementary Note 27 is, for example, the cable system 10 illustrated in FIG. 2 or 5. The cable system in Supplementary Notes 28 and 29 is, for example, the cable system 10 illustrated in FIG. 2. The cable system in Supplementary Note 30 is, for example, the cable system 10 illustrated in FIG. 2. The cable system in Supplementary Notes 31 and 32 is, for example, the cable system 10 illustrated in FIG. 8.

The cable system in Supplementary Notes 33 to 36 is, for example, the cable system 10 that includes an ITG that performs the operation described in the fourth example embodiment.

The present invention was described above using the above-described example embodiments as exemplary examples. However, the present invention is not limited to the above-described example embodiments. Various modes that could be understood by a person skilled in the art may be applied to the present invention within the scope of the present invention.

This application is based upon and claims the benefit of priority from Japanese Patent Application No. 2019-203272, filed on Nov. 18, 2019, the disclosure of which is incorporated herein in its entirety by reference.

REFERENCE SIGNS LIST 1, 2 Optical fiber section
10 Cable system
11, 12 Terminal station device
111, 116, 118, 121, 127, 128 Transponder group
112, 122 Wavelength division multiplexing separator
117, 119, 129 ITG
1191, 1291 Transmission unit
1192, 1292 Reception unit
1186, 1187, 133a, 133b, 3m8, 3m9, 3m10, 3m11, 3m31, 91, 92, 93, 94, 95, 96 Coupler
134a, 134b, 16 Wavelength selection coupler
21 Optical cable
31, 32, 3(n−1), 3n Optical amplification repeater device
314, 324, 3(n−1)4, 3n4, 3x Optical amplification unit
3ax First amplifier
3bx Second amplifier
1183, 1184, 1281, 1284, 3m2, 3m3, 3m4, 3m5, 3m21, 3m22, 3m32, 3n42, 3n43 Optical amplifier
1182, 1282, 3m6, 3m7, 3n44 Filter
3m12, 3m13, 3m16, 3n47 Switch
1283, 3m15, 3n45, 3n46 Circulator
411, 412, 413, 414 Fiber pair (FP)
4141, 4142 Optical fiber
71, 72 Optical fiber
81, 82 Optical amplifier
901, 902 Portion

What is claimed is:

1. A cable system using a cable including a plurality of optical fibers for optical fiber sensing of an environment surrounding the cable, the cable system comprising
an optical amplification repeater configured to compensate for transmission loss including loss in the optical fibers,
wherein the optical fiber sensing is sensing in which probe light, which is transmitted light used for the optical fiber sensing, is transmitted through one of the optical fibers and backscattered light that is related to the probe light and arrives from the optical fiber is received and analyzed,
to at least one end of the cable, a transceiver for sensing that performs configured to perform the optical fiber sensing is connected, and
in the optical fiber having a function of the optical fiber sensing,
when there is a first wavelength band in which a wavelength of an optical signal used for a use other than the sensing is assigned, the first wavelength band and a second wavelength band that is a wavelength of the probe light and the backscattered light are arranged in such a way as to be different from each other,
an optical amplifier included in the optical amplification repeater, the optical amplifier configured to perform amplification and repeat of light transmitted through the optical fiber having a function of the optical fiber sensing, includes a first amplifier and a second amplifier configured to amplify rays of light propagating in opposite directions to each other, and
each of the probe light and the backscattered light is amplified by one of the first amplifier and the second amplifier.

2. The cable system according to claim 1, wherein
a number of the optical fibers used for the optical fiber sensing is smaller than a number of all the optical fibers included in the cable, and
in the optical amplification, repeater, an optical amplifier for the optical fiber sensing is added only to an optical amplifier connected to an optical fiber used for the optical fiber sensing.

3. The cable system according to claim 1, wherein,
in the optical fiber having a function of the optical fiber sensing,
the probe light and the backscattered light are subjected to single-core bidirectional transmission through the single optical fiber and are subjected to amplification repeat transmission by use of an optical amplification repeater having a single-core bidirectional configuration.

4. The cable system according to claim 3, wherein
an optical signal used for a use other than the sensing is an optical signal for optical fiber communication, and
the probe light is transmitted in an opposite direction to a direction of the optical signal for optical fiber communication that is transmitted through the optical fiber.

5. The cable system according to claim 3 further comprising
a transmission blocker configured to perform blocking of transmission of the probe light or the backscattered light by remote operation.

6. The cable system according to claim 5, wherein
the blocking is performed by suspending excitation of an optical amplifier configured to amplify the probe light or the backscattered light.

7. The cable system according to claim 3 comprising,
at an end of the cable at which the transceiver for sensing and the cable are connected to each other,
a pair of optical amplifiers for the probe light and the backscattered light, the optical amplifiers having directions opposite to each other.

8. The cable system according to claim 3 comprising,
at an end of the cable at which the transceiver for sensing and the cable are connected to each other,
an optical amplifier of a single-core bidirectional type for the probe light.

9. The cable system according to claim 1, wherein
in the optical fiber having a function of the optical fiber sensing, the probe light and the backscattered light related to the probe light are configured to be transmitted through an optical fiber pair that is two fibers constituting a pair and having transmission directions opposite to each other,
the cable system comprising, in the optical amplification repeater configured to amplify rays of light transmitted through the two optical fibers constituting a pair, a light path configured to cause the backscattered light to be multiplexed with light transmitted through the other optical fiber of the two optical fibers constituting a pair,
wherein the light path includes an optical amplifier and an optical filter configured to select a wavelength band of the backscattered light that is allowed to pass the light path and amplify the backscattered light.

10. The cable system according to claim 9 comprising
a light path that, at an end of the cable at which the transceiver for sensing and the cable are connected to each other, causes the backscattered light to be multiplexed with light transmitted through the other optical fiber included in the optical fiber pair,
wherein the light path includes an optical amplifier and an optical filter configured to select a wavelength band of the backscattered light that is allowed to pass the light path and amplify the backscattered light.

11. The cable system according to claim 9 further comprising
a transmission blocker configured to perform blocking of transmission of the backscattered light by remote operation.

12. The cable system according to claim 11, wherein
the blocking is performed by suspending excitation of the optical amplifier configured to amplify the backscattered light.

13. The cable system according to claim 9 further comprising
a transmission blocker configured to perform blocking of transmission of the probe light by remote operation.

14. The cable system according to claim 9, wherein,
to an optical fiber pair among a plurality of the optical fiber pairs, the transceiver for sensing configured to include transmitter configured to transmit rays of the probe light having wavelengths different from each other and receptor configured to receive rays of the backscattered light related to the rays of the probe light are connected in an opposing manner.

15. The cable system according to claim 9, wherein,
to the optical fiber pairs that are included in the cable and are different from each other, the transceiver for sensing configured to include transmitter configured to transmit rays of the probe light having a same wavelength and receptor configured to receive rays of the backscattered light related to the rays of the probe light are connected in an opposing manner.

16. The cable system according to claim 1 further comprising
the transceiver for sensing including a processor,
wherein the processor performs the analysis as well as determination of whether data having been subjected to the analysis is valid data or invalid data as data representing surrounding environmental information of the cable and adds predetermined attribute information to the data that are determined to be the invalid data or does not output the data that are determined to be the invalid data.

17. The cable system according to claim 16, wherein
the processor performs the determination, based on any one of a signal level, a noise level, and a signal to noise ratio of the received backscattered light.

\* \* \* \* \*